(12) United States Patent
Dai et al.

(10) Patent No.: US 6,658,016 B1
(45) Date of Patent: Dec. 2, 2003

(54) PACKET SWITCHING FABRIC HAVING A SEGMENTED RING WITH TOKEN BASED RESOURCE CONTROL PROTOCOL AND OUTPUT QUEUING CONTROL

(75) Inventors: William Dai, San Jose, CA (US); Jason Chao, Cupertino, CA (US); Yao-Ching Liu, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 09/515,590

(22) Filed: Feb. 29, 2000

Related U.S. Application Data
(60) Provisional application No. 60/123,091, filed on Mar. 5, 1999.

(51) Int. Cl.[7] .............................................. H04L 12/56
(52) U.S. Cl. ...................... 370/424; 370/438; 370/460
(58) Field of Search ................................. 370/424, 438, 370/460, 222, 223, 224, 258, 395.53, 403, 404, 406, 429, 452, 909, 400, 462, 229, 230, 416, 413, 414, 418, 461; 709/201, 253

(56) References Cited

U.S. PATENT DOCUMENTS

| | | | | |
|---|---|---|---|---|
| 4,554,659 A | * | 11/1985 | Blood et al. | 370/437 |
| 5,181,202 A | * | 1/1993 | Walser et al. | 370/452 |
| 5,206,857 A | * | 4/1993 | Farleigh | 370/452 |
| 5,208,809 A | * | 5/1993 | Fergeson et al. | 370/545 |
| 5,519,698 A | * | 5/1996 | Lyles et al. | 370/411 |
| 5,689,508 A | * | 11/1997 | Lyles | 370/391 |
| 5,764,392 A | * | 6/1998 | Van As et al. | 398/79 |
| 5,883,895 A | * | 3/1999 | Davis et al. | 370/462 |
| 6,246,692 B1 | * | 6/2001 | Dai et al. | 370/438 |
| 6,363,077 B1 | * | 3/2002 | Wong et al. | 370/422 |
| 6,420,901 B2 | * | 7/2002 | Liu et al. | 326/38 |
| 2001/0047446 A1 | * | 11/2001 | Liu et al. | 710/240 |

\* cited by examiner

*Primary Examiner*—Dang Ton
*Assistant Examiner*—Tri H. Phan
(74) *Attorney, Agent, or Firm*—Squire, Sanders & Dempsey L.L.P.

(57) ABSTRACT

A packet switching fabric includes means forming a data ring, means forming a control ring, and means forming a plurality of data communication network links each having at least one network node coupled thereto. The fabric further includes a plurality of output queuing controlled switching devices coupled together by the data ring means and the control ring means so that the network links can be selectively communicatively coupled. Each of the output queuing controlled switching devices includes control ring processing means operative to develop, transmit and receive control messages to and from adjacent ones of the devices via the control ring means. The control messages provide for controlling packet transfer operations including transmitting associated selected ones of the received data packets from the associated source device to the associated destination device via an associated source-destination channel path including associated ones of the data ring segments and an associated one of the memory unit links. A channel resource patrol message is passed by each one of the devices, the patrol message carrying channel bandwidth information indicative of bandwidth available on the data ring means and bandwidth available on memory unit links. The control ring processing means is responsive to the channel bandwidth information and operative to read and modify the channel bandwidth information for the purpose of managing data transfer via the data ring means and via each of the memory unit links.

43 Claims, 22 Drawing Sheets

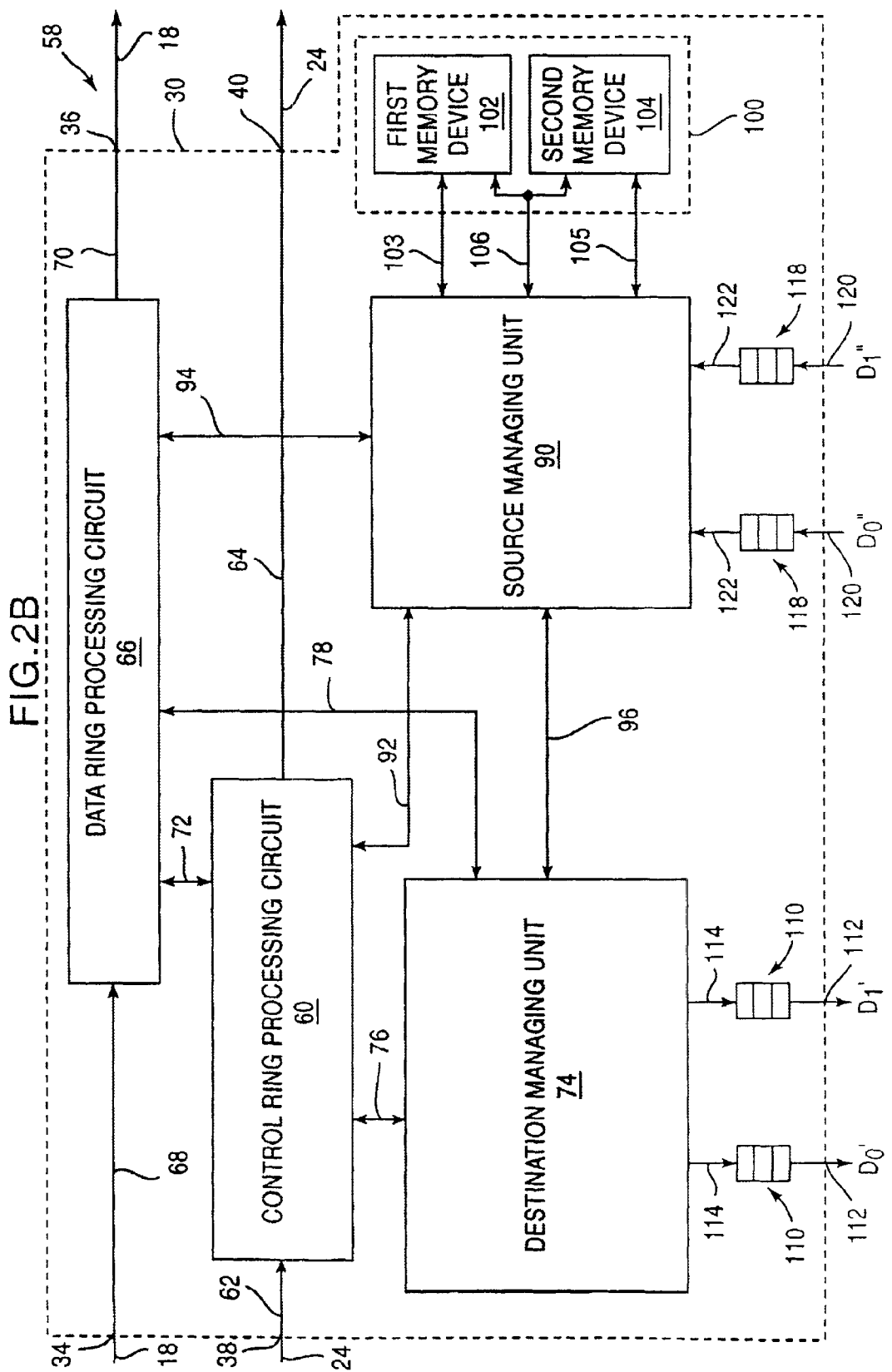

SOURCE IDENTIFICATION MAPPING TABLE 540

| SRC_ID[7:0] | SOURCE |
|---|---|
| 0000_0000~0000_0111 | LOCAL SWITCH DEVICE 0, PORT 0 ~ PORT 7 |
| 0000_1000~0000_1111 | LOCAL SWITCH DEVICE 0, RESERVED |
| 0001_0000~0001_0111 | LOCAL SWITCH DEVICE 1, PORT 0 ~ PORT 7 |
| 0001_1000~0001_1111 | LOCAL SWITCH DEVICE 1, RESERVED |
| 0010_0000~0010_0111 | LOCAL SWITCH DEVICE 2, PORT 0 ~ PORT 7 |
| 0010_1000~0010_1111 | LOCAL SWITCH DEVICE 2, RESERVED |
| 0011_0000~0011_0111 | LOCAL SWITCH DEVICE 3, PORT 0 ~ PORT 7 |
| 0011_1000~0011_1111 | LOCAL SWITCH DEVICE 3, RESERVED |
| 0100_0000~0100_0111 | LOCAL Hi-FUNCTION DEVICE 1, SOCKET 0 ~ 7 |
| 0100_1000~0100_1111 | REMOTE Hi-FUNCTION DEVICE 1, SOCKET 0 ~ 7 |
| 0101_0000~0101_1111 | GATEWAY 0 ~ 15 |
| 0110_0000~0111_1111 | TRUNK 0 ~ 31 |
| 1000_0000~1111_1111 | MULTICAST GROUP 0 ~ 127 |

- 542: rows 1-2
- 544: rows 3-4
- 546: rows 5-6
- 548: rows 7-8
- 552: row 9
- 554: row 10
- 556: row 11
- 558: row 12
- 560: row 13

FIG. 5A

DESTINATION IDENTIFICATION MAPPING TABLE 570

| DST_ID[7:0] | SOURCE |
|---|---|
| 000_0000~000_0111 | LOCAL SWITCH DEVICE 0, PORT 0 ~ PORT 7 |
| 000_1000~000_1101 | RESERVED |
| 000_1110 | LOCAL SWITCH DEVICE 0, 10 Mbps PORT GROUP |
| 000_1111 | LOCAL SWITCH DEVICE 0, 100 Mbps PORT GROUP |
| 001_0000~001_0111 | LOCAL SWITCH DEVICE 1, PORT 0 ~ PORT 7 |
| 001_1000~001_1101 | RESERVED |
| 001_1110 | LOCAL SWITCH DEVICE 1, 10 Mbps PORT GROUP |
| 001_1111 | LOCAL SWITCH DEVICE 1, 100 Mbps PORT GROUP |
| 010_0000~010_0111 | LOCAL SWITCH DEVICE 2, PORT 0 ~ PORT 7 |
| 010_1000~010_1101 | RESERVED |
| 010_1110 | LOCAL SWITCH DEVICE 2, 10 Mbps PORT GROUP |
| 010_1111 | LOCAL SWITCH DEVICE 2, 100 Mbps PORT GROUP |
| 011_0000~011_0111 | LOCAL SWITCH DEVICE 3, PORT 0 ~ PORT 7 |
| 011_1000~011_1101 | RESERVED |
| 011_1110 | LOCAL SWITCH DEVICE 3, 10 Mbps PORT GROUP |
| 011_1111 | LOCAL SWITCH DEVICE 3, 100 Mbps PORT GROUP |
| 100_0000~100_0111 | LOCAL Hi-FUNCTION DEVICE 1, SOCKET 0 ~ 7 |
| 100_1000~100_1111 | REMOTE Hi-FUNCTION DEVICE 1, SOCKET 0 ~ 7 |
| 101_0000~101_1111 | GATEWAY 0 ~ 15 |
| 110_0000~111_1111 | RESERVED |

FIG.6
CHANNEL RESOURCE PATROL MESSAGE (OR TOKEN)

| BIT LOCATION | DESCRIPTION |
|---|---|
| Header Bit | 0 |
| Bit 31 ~ Bit 28 | 0000 |
| Bit 27 ~ Bit 25 | SubType [2:0] = 000 (Channel Resource Patrol) |
| Bit 24 ~ Bit 23 | Reserved |
| Bit 22 | 0 |
| Bit 21 | Reserved |
| Bit 20 | 0 |
| Bit 19 ~ Bit 15 | HiFunction Device LinkBW [4:0] |
| Bit 14 ~ Bit 11 | HiFunction Device BBW [3:0] |
| Bit 10 ~ Bit 7 | HiFunction Device ABW [3:0] |
| Bit 6 ~ Bit 2 | 00010 |
| Bit 1 ~ Bit 0 | Reserved |

| BIT LOCATION | DESCRIPTION |
|---|---|
| Header Bit | 1 |
| Bit 31 ~ Bit 29 | Reserved |
| Bit 28 ~ Bit 24 | Device 3 LinkBW [4:0] |
| Bit 23 ~ Bit 21 | Reserved |
| Bit 20 ~ Bit 16 | Device 2 LinkBW [4:0] |
| Bit 15 ~ Bit 13 | Reserved |
| Bit 12 ~ Bit 8 | Device 1 LinkBW [4:0] |
| Bit 7 ~ Bit 5 | Reserved |
| Bit 4 ~ Bit 0 | Device 0 LinkBW [4:0] |

| BIT LOCATION | DESCRIPTION |
|---|---|
| Header Bit | 1 |
| Bit 31 ~ Bit 28 | Device 3 MemBBW [3:0] |
| Bit 27 ~ Bit 24 | Device 3 MemABW [3:0] |
| Bit 23 ~ Bit 20 | Device 2 MemBBW [3:0] |
| Bit 19 ~ Bit 16 | Device 2 MemABW [3:0] |
| Bit 15 ~ Bit 12 | Device 1 MemBBW [3:0] |
| Bit 11 ~ Bit 8 | Device 1 MemABW [3:0] |
| Bit 7 ~ Bit 4 | Device 0 MemBBW [3:0] |
| Bit 3 ~ Bit 0 | Device 0 MemABW [3:0] |

PACKET INITIALIZATION MESSAGE

650

652

| BIT LOCATION | DESCRIPTION |
|---|---|
| Header Bit | 0 |
| Bit 31 ~ Bit 28 | 0000 |
| Bit 27 ~ Bit 25 | SubType [2:0] = 001 (Packet Transfer Initialization) |
| Bit 24 ~ Bit 23 | SRC DevID [2:1] |
| Bit 22 | 0 |
| Bit 21 | SRC DevID [0] |
| Bit 20 | 0 |
| Bit 19 ~ Bit 14 | Reserved |
| Bit 13 ~ Bit 7 | Packet DST ID [6:0] |
| Bit 6 ~ Bit 2 | 00001 |
| Bit 1 ~ Bit 0 | OPERATION TYPE<br>00: ABORT<br>01: Transmit<br>10: RESERVED<br>11: RESERVED |

654 — Bit 27 ~ Bit 25
656 — Bit 24 ~ Bit 23
658 — Bit 21
660 — Bit 13 ~ Bit 7
662 — Bit 1 ~ Bit 0

670

| BIT LOCATION | DESCRIPTION |
|---|---|
| Header Bit | 1 |
| Bit 31 ~ Bit 24 | Reserved |
| Bit 23 ~ Bit 22 | Reserved |
| Bit 21 ~ Bit 20 | Reserved |
| Bit 19 ~ Bit 18 | Output Control For Remote HiFunction Socket 0 |
| Bit 17 ~ Bit 16 | Output Control For Gateway 7 |
| Bit 15 ~ Bit 14 | Output Control For Port 7/Gateway 6 |
| Bit 13 ~ Bit 12 | Output Control For Port 6/Gateway 5 |
| Bit 11 ~ Bit 10 | Output Control For Port 5/Gateway 4 |
| Bit 9 ~ Bit 8 | Output Control For Port 4/Gateway 3 |
| Bit 7 ~ Bit 6 | Output Control For Port 3/Gateway 2 |
| Bit 5 ~ Bit 4 | Output Control For Port 2/Gateway 1 |
| Bit 3 ~ Bit 2 | Output Control For Port 1/Gateway 0 |
| Bit 1 ~ Bit 0 | Output Control For Port 0/Local HiFunction Socket 0<br>00: No Transmit;<br>01: Transmit Without Modification;<br>10: Transmit With Tag;<br>11: Transmit Without Tag. |

FIG. 7

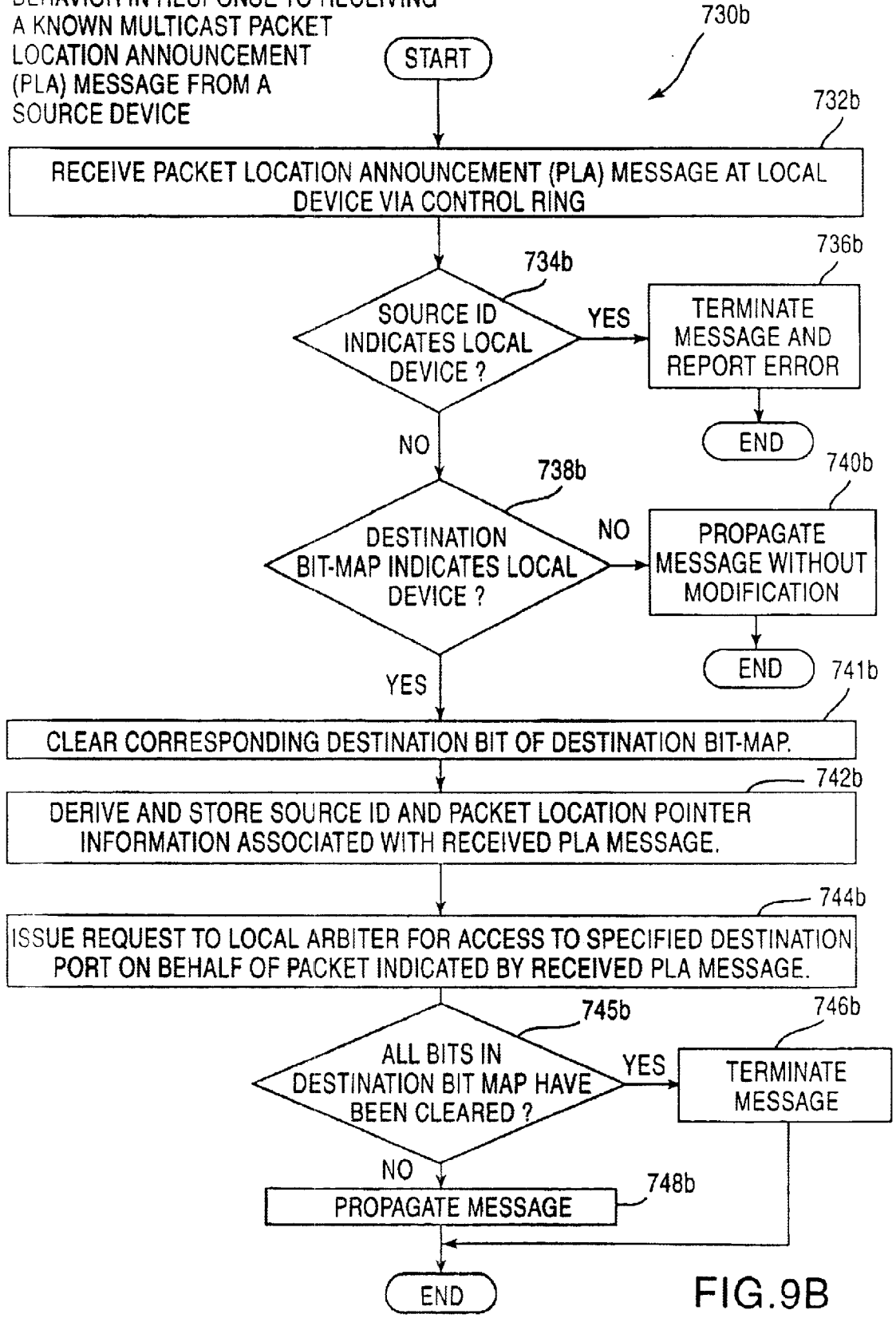

PACKET SWITCHING FABRIC HAVING A SEGMENTED RING WITH TOKEN BASED RESOURCE CONTROL PROTOCOL AND OUTPUT QUEUING CONTROL

CROSS-REFERENCE TO RELATED APPLICATIONS

Reference is made to and priority claimed from U.S. Provisional Application Ser. No. 60/123,091, filed Mar. 5, 1999, entitled "Packet Switching System."

BACKGROUND OF THE INVENTION

The present invention relates generally to packet switching fabrics for use in data communications networks. Specifically, the present invention pertains to a packet switching fabric having a plurality of switching devices arranged in a ring topology and operating in accordance with an output queuing controlled packet transfer protocol.

DESCRIPTION OF THE PRIOR ART

Switching devices are essential components of data communication networks including local area networks (LANs), such as ETHERNET, and wide area networks (WANs). Common switching devices include cross bar switching devices, and packet switching fabrics. A packet switching fabric is an interconnection architecture which uses multiple stages of switches to route transactions between a source address and a destination address of a data communications network. A packet switching fabric may have a variety of different architectures, or topologies.

Cross bar switching devices typically include a plurality of N input ports, a plurality of N output ports, and a switching matrix having redundant interconnection resources requiring a complexity of N×N for selectively connecting the input ports to the output ports. One problem with cross bar switching devices is achieving scalability of the number of network ports. Because of the N×N complexity of the interconnection resources, exponential costs are incurred when increasing the number of network ports of a cross bar switching device.

Because packet switching fabrics include multiple switching devices, fabrics provide better scalability than crossbar switches because each of the switching devices of the fabric includes a plurality of network ports, and the number of switching devices of the fabric may be increased in order to increase the number of network connections for the switch. However, prior art packet switching fabrics usually have a bus topology including a back plane, or bus, having a plurality of slots for cards including the network ports. One problem with such switching devices is modularity. While a number of cards having additional network ports may be inserted into slots of the back plane to increase the total number of network ports, the maximum number of cards which may be added is limited because the back plane may support only a limited number of cards due to loading effects on the back plane. Therefore, the modularity problem of bus architecture packet switching fabrics imposes a limit on the scalability of the number of network ports of the fabric.

Typically, each device of a switching fabric includes a plurality of switching devices each including: network ports for transmitting and receiving data packets to and from network nodes via network communication links; and internal data link ports for transmitting and receiving data packets to and from other switch devices of the fabric. The switching devices of a switching fabric may be configured in any one of a variety of topologies, or architectures. In a switching fabric having a ring architecture, the devices are configured in a ring topology. Because each connection in a ring architecture switching fabric is a point to point link, ring architecture switching fabrics allow for higher frequencies and greater throughput between devices than bus architecture fabrics.

Typical prior art ring architecture switching fabrics are controlled by a token ring protocol wherein only one device of the ring transmits data at a time. Therefore, prior art ring architecture switching fabrics are not commonly used for network switching which requires high data throughput. An important objective of the present invention is to provide a ring architecture packet switching fabric which is capable of concurrently processing an increased number of packet transfer operations between a large number of source network nodes and corresponding destination network nodes, thereby allowing for greater switching throughput.

Each switching device of a switching fabric reads header information of a data packet, received from a source node via one of its network ports, in order to dynamically route the data packet to an appropriate destination network port, or ports, which is communicatively to a destination node specified by a destination address carried in the header information of the data packet. The destination network port may be a local network port of the same switching device, having the source port at which the packet is received, or maybe a network port of another switching device of the fabric. The process of transferring a data packet received at a network port of a source device to a network port of a destination device is referred to herein as a packet transfer operation. In order to transfer data from a source device to a destination device, an internal source-destination channel path coupling the source port to the destination port is required.

In many data communications networks, and particularly in local area networks, (e.g., ETHERNET), when a destination node of the network begins receiving a data packet, the transmission of the data packet to that node cannot be interrupted, even by transmission of an idle signal. Therefore, transmission of a data packet from a destination output port of a switching fabric to a corresponding destination node must not be interrupted. Therefore, most switching fabrics include transmit buffers at each network port which are large enough to store a whole packet of data. However, this is undesirable because the use of large buffers limits the number of network ports which can be implemented on an integrated circuit chip.

Another objective of the present invention is to provide a ring architecture packet switching fabric wherein each integrated circuit switching device of the fabric has higher integration thereby allowing for an increased number of network ports.

A further objective of the present invention is to provide a packet switching fabric providing convenient scalability wherein the total number of network ports supported by the fabric may be scaled up without incurring exponential costs such as in cross bar switching devices.

Yet another objective of the present invention is to provide a packet switching fabric which provides higher data transfer rates via source-destination channel paths established between switching devices of the fabric thereby allowing for cut-through packet transfer between a source device and a corresponding destination port. Achieving this objective of the present invention also provides a packet switching fabric wherein each switching device of the fabric has an increased number of ports.

SUMMARY OF THE INVENTION

It is an object of the present invention to provide a ring architecture packet switching fabric wherein each integrated circuit switching device of the fabric has higher integration thereby allowing for an increased number of network ports.

Another object of the present invention is to provide a packet switching fabric providing convenient scalability wherein the total number of network ports supported by the fabric may be scaled up without incurring exponential costs such as in cross bar switching devices.

A further object of the present invention is to provide a packet switching fabric which provides higher data transfer rates via source-destination channel paths established between switching devices of the fabric thereby allowing for cut-through packet transfer between a source device and a corresponding destination port.

Yet another object of the present invention is to provide a packet switching fabric which provides reduced delays in packet transfer operations, and therefore faster switching.

Briefly, a presently preferred embodiment of the present invention comprises a packet switching fabric including means forming a data ring, means forming a control ring, and means forming a plurality of data communication network links each having at least one network node coupled thereto. The packet switching fabric further includes a plurality of output queuing controlled switching devices coupled together by the data ring means and the control ring means so that the network links can be selectively communicatively coupled.

Each of the switching devices includes: data ring processing means for transmitting and receiving bursts of data to and from adjacent ones of the devices via the data ring means; network interface means having at least one network port for transmitting and receiving data packets to and from the network links ; and packet buffer means for storing the received data packets.

Each of the switching devices further includes: source managing means communicatively coupled to the data ring processing means, and providing an interface between the network interface means and the packet buffer means, the source managing means being operative to develop pointer information for storing and reading each one of the received data packets to and from the packet buffer means, and also being operative to develop destination identification information associated with each one of the received data packets, the destination identification information indicating an associated destination one of the network ports of an associated destination one of the devices, the received data packets including transfer packets received at an associated source one of the devices that is different from the associated destination device, and local packets for which the associated destination network port is a port of the associated source device, the pointer information and destination identification information associated with each one of the local packets providing local announcement information serving as a local request for access to the associated destination network port, the pointer information and destination identification information associated with each one of the transfer packets providing transfer announcement information; control ring processing means responsive to the transfer announcement information, and operative to transmit and receive control messages to and from adjacent ones of the devices via the control ring means, the control messages including announcement messages each being associated with one of the transfer packets and carrying the associated transfer announcement information, the control ring processing means also being operative to provide received transfer announcement information in response to each received one of the announcement messages, the received transfer announcement information serving as a remote request for access to the associated destination network port; and destination managing means communicatively coupled to the network interface means, and responsive to the local announcement information and the received transfer announcement information, and operative to arbitrate between competing ones of the local and remote requests for access to each of the network ports, and also operative to generate transfer notification information associated with selected ones of the transfer data packets.

The control messages further include transfer notification messages developed by the control ring processing means in response to the transfer notification information, each the notification message being associated with one of the transfer data packets and carrying source identification information indicative of the associated source device, each the notification message indicating to the associated source device that the associated selected transfer data packet has been granted access to the associated destination network port.

The network interface means includes a plurality of transmit buffer queues each providing for receiving data from the destination managing means, and for transmitting bursts of data to a corresponding one of the network links via a corresponding one of the network ports.

The destination managing means includes an output buffer manager for monitoring the availability of buffer space in each of the transmit buffer queues, and wherein each of the notification messages is transferred via the control ring means after a determination by the output buffer manager that an associated destination one of the transmit buffer queues, that is connected to the associated destination network port, includes a threshold amount of available buffer space.

The output buffer manager is operative to determine a number of blocks of buffer space available at each of the transmit buffer queues, each of the available blocks providing buffer space sufficient for receiving a burst of packet data from the destination managing means.

The notification information further comprises an initial channel credit value indicating of a number of available blocks at the destination transmit buffer queue associated with the selected transfer data packet prior to transmitting the associated notification message.

The data ring means includes a plurality of data ring segments each coupling a corresponding adjacent pair of the devices together. The packet buffer means includes at least one memory unit communicatively coupled with the source managing means via a corresponding memory unit link. Each of the devices is responsive to a channel resource patrol message received from an adjacent one of the devices, the patrol message carrying channel bandwidth information including a plurality of data ring segment bandwidth parameters each being indicative of an amount of bandwidth currently available at a corresponding one of the data ring segments, and a plurality of memory unit link bandwidth parameters each being indicative of an amount of bandwidth currently available at a corresponding one of the memory unit links.

The control ring processing means is responsive to the channel bandwidth information, and operative to read and modify the channel bandwidth information for the purpose of managing data transfer via corresponding ones of a plurality of source-destination channel paths for transmitting associated ones of the selected transfer data packets from the associated source device to the associated destination device, each of the paths including corresponding ones of the data ring segments and a corresponding one of the memory unit links.

An important advantage of the packet switching fabric of the present invention is that it provides reduced delays in packet transfer operations, and therefore faster switching operations.

The foregoing and other objects, features, and advantages of the present invention will be apparent from the following detailed description of the preferred embodiment which makes reference to the several figures of the drawing.

IN THE DRAWING

FIG. 2B is a generalized block diagram of a high speed network port switching device of the packet switching fabric of FIG. 1;

FIGS. 5A and 5B are block diagrams depicting source and destination identification tables respectively for mapping source and destination identification values to corresponding ones of the switching devices and network ports of the switching devices;

FIG. 6 is a block diagram depicting a field structure of a channel resource patrol message (or token message) transmitted via the data ring of FIG. 1, the patrol message including channel bandwidth information indicative of available bandwidth resources for transmitting bursts of data between the switching devices via the data ring;

FIG. 7 is a block diagram depicting a field structure of a packet transfer initialization message transmitted via the data ring of FIG. 1 for use in multicast packet transfer operations;

FIG. 9B is a flow diagram illustrating a destination device managing process performed by the destination managing unit of a destination one of the switching devices in response to receiving a multicast PLA message;

Figure 12:
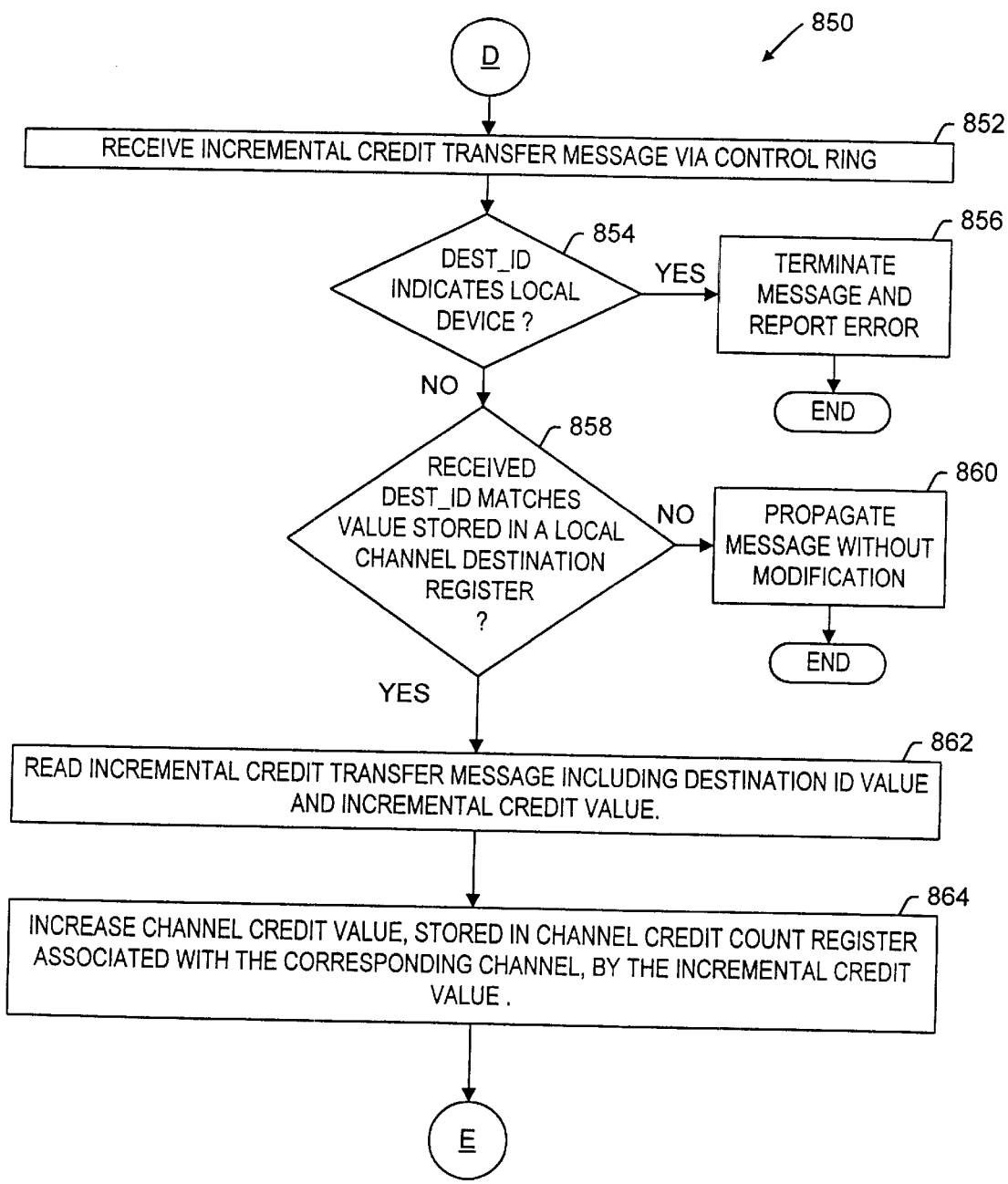
Figure 13:
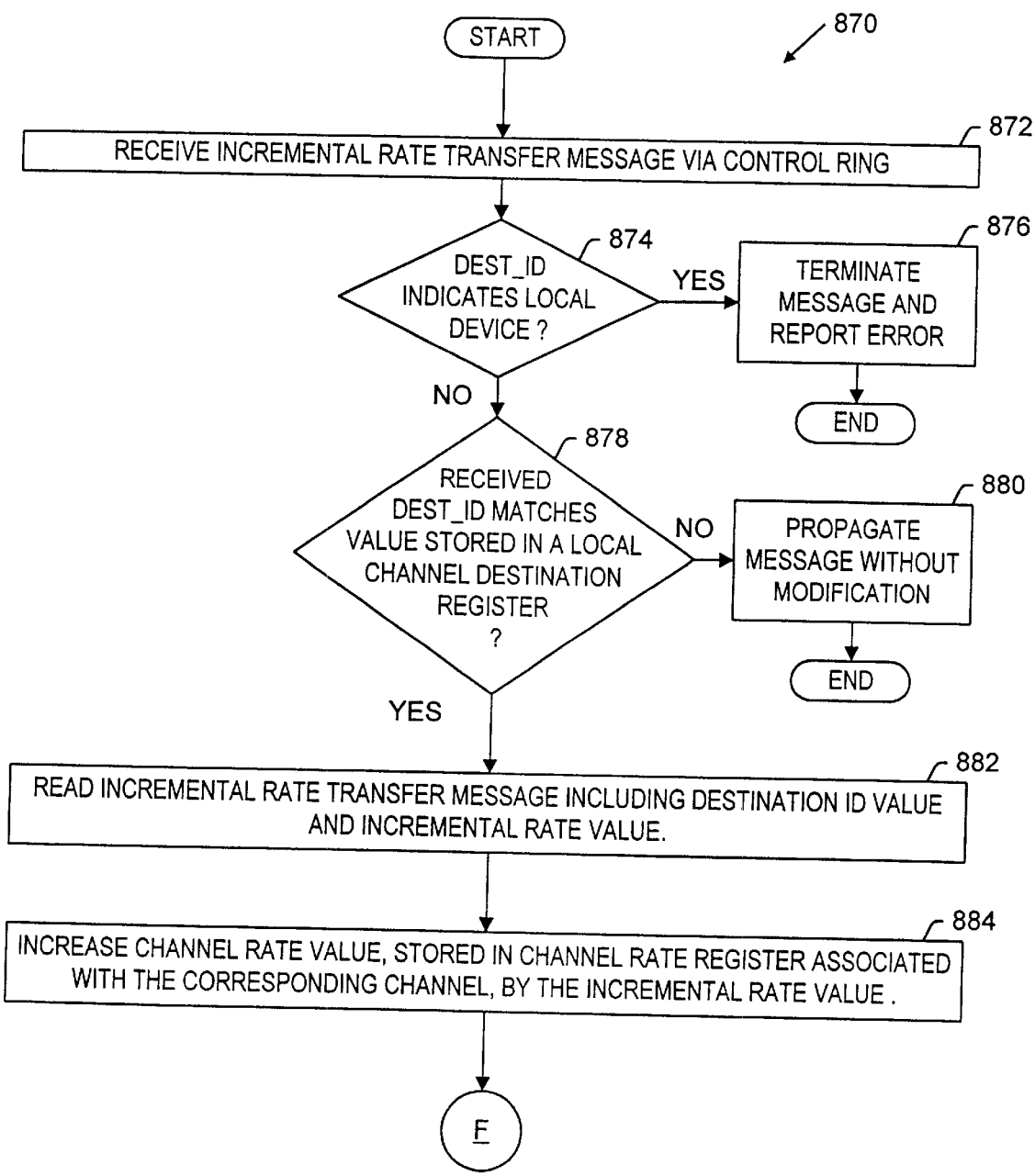

FIG. 12 is a flow diagram illustrating a process performed by the source managing unit of a source switching device in response to receiving an incremental credit transfer message from a corresponding destination switching device; and FIG. 13 is a flow diagram illustrating a process performed by the source managing unit of a source switching device in response to receiving an incremental rate transfer message from a corresponding destination switching device.

DETAILED DESCRIPTION OF THE PREFERRED EMBODIMENTS

Figure 1:
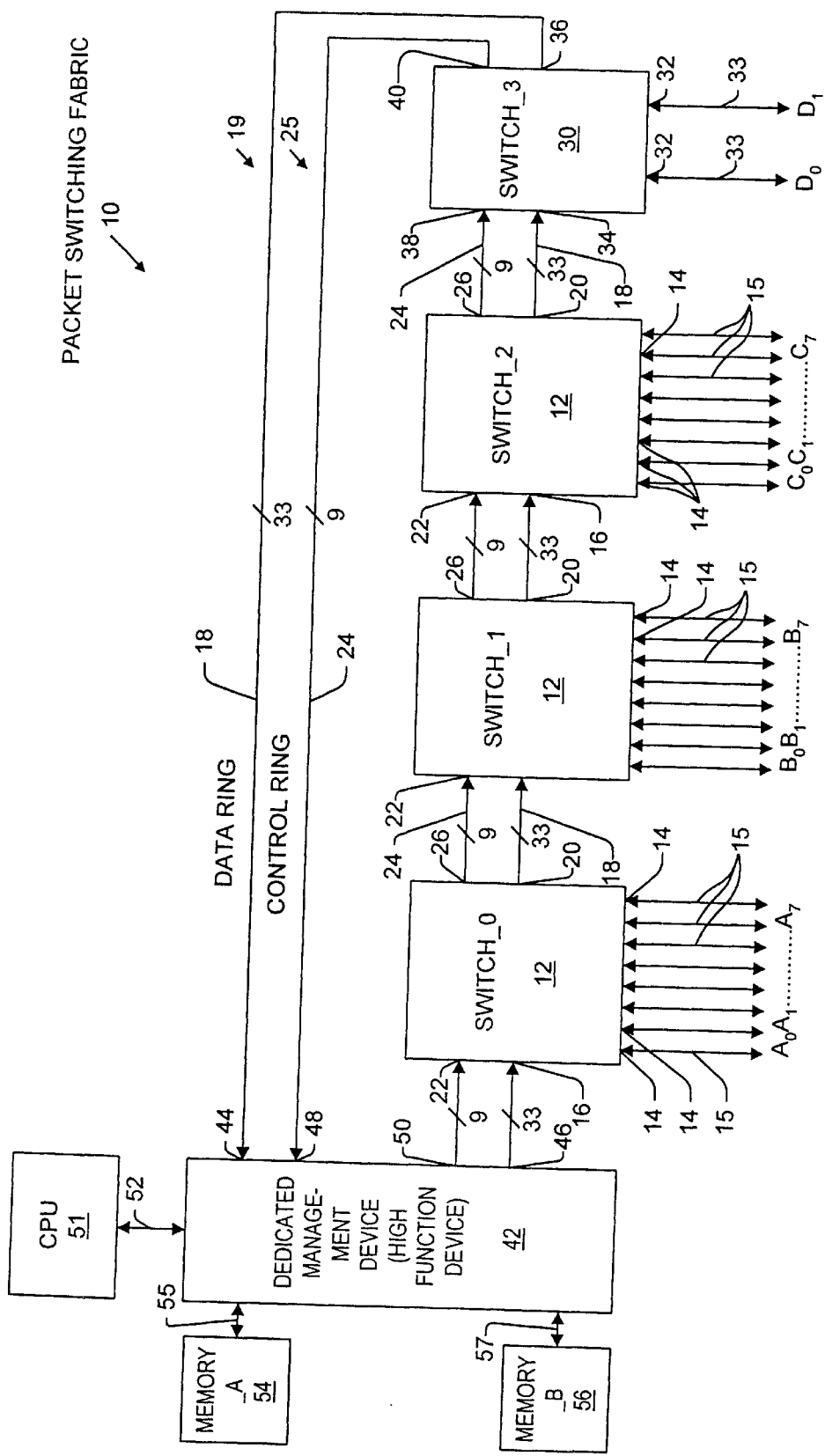
FIG. 1 is a schematic block diagram of a packet switching fabric according to the present invention including a plurality of switching devices arranged in a ring topology and intercoupled via a data ring, and a control ring which provides for implementing an output queuing controlled protocol for managing the data transfer capacity of the data ring.

FIG. 1 shows a schematic block diagram of a packet switching fabric at 10 according to the present invention, the fabric 10 including three cut-through packet transfer switching devices 12, designated SWITCH_0, SWITCH_1, and SWITCH_2, each having: eight network ports 14 designated ($A_0, A_1, \ldots, A_7$), ($B_0, B_1, \ldots, B_7$), and ($C_0, C_1, \ldots, C_7$) respectively for transmitting and receiving data packets via corresponding lower and middle bandwidth ETHERNET links 15 each having a bandwidth of either 10 Mbps or 100 Mbps; a data ring input port 16 for receiving data and data ring messages from an upstream device via a corresponding one of a plurality of 33-bit data ring segments 18; a data ring output port 20 connected to transmit data and data ring messages to a corresponding downstream device via a corresponding one of the data ring segments 18; a control ring input port 22 for receiving control messages, which include output queuing controlled packet transfer protocol messages, from the corresponding upstream device via a corresponding one of a plurality of nine-bit control ring segments 24; and a control ring output port 26 for transmitting control messages to the corresponding downstream device via a corresponding one of the control ring segments 24. The data ring segments 18 form a data ring 19, and the control ring segments 24 form a control ring 25 for intercoupling the switching devices as described above.

The packet switching fabric 10 also includes a high speed network port switching device 30, designated SWITCH_3, having: two high speed network ports 32 designated $D_0$ and $D_1$ for transmitting and receiving data packets via a pair of corresponding 1 Gbps ETHERNET links 33; a data ring input port 34 for receiving data and data ring messages from the upstream device, SWITCH_2, via a corresponding one of the data ring segments 18; a data ring output port 36 connected to transmit data and data ring messages to a corresponding downstream device via a corresponding one of the data ring segments; a control ring input port 38 for receiving control messages from the corresponding upstream device via a corresponding one of the control ring segments 24; and a control ring output port 40 connected to transmit control messages to the corresponding downstream device via a corresponding one of the control ring segments.

The packet switching fabric 10 further includes: a dedicated ring management device 42 having a data ring input port 44 for receiving data and data ring messages from the corresponding upstream device, SWITCH_3, via a corresponding one of the data ring segments 18, a data ring output port 46 connected to transmit data and data ring messages to the corresponding downstream device, SWITCH_1, via a corresponding one of the data ring segments, a control ring input port 48 for receiving control messages from the upstream device, SWITCH_3, via a corresponding one of the control ring segments 24, and a control ring output port 46 connected to transmit control messages to the downstream device via a corresponding one of the control ring segments; a central processing unit 51 communicatively coupled with the management device 42 via a CPU link 52; a first high function memory unit 54 designated MEMORY_A communicatively coupled with the management device 42 via a first memory unit link 55; and a second high function memory unit 56 designated MEMORY_B communicatively coupled with the management device 42 via a second memory unit link 57. The bandwidth, or data transfer capacity, of the CPU link 52 depends on the bandwidth of the bus of the CPU.

In one embodiment, each of the data ring segments 18 is 33 bits wide and is used for transmitting data channel link signals which are clocked at 66 MHz. The total bandwidth for signals transmitted via each data ring segment is 3.2 Gbps. Each of the control ring segments 24 of the fabric is nine-bits wide and is used for transmitting control ring signals which are also clocked at 66 MHz.

Packet transfer operations executed in the switching fabric 10 (FIG. 1) include: local packet transfer operations wherein a data packet is received and transmitted from network ports 14 or 32 of the same switching device; and remote packet transfer operations wherein a data packet is received at a network port 14 or 32 of a source one of the switching devices and transmitted from a network port of a destination one of the switching devices that is communicatively coupled to the source device via the data ring 19 and control ring 25. Also, as further explained below, the local and remote packet transfer operations may be either unicast or multicast operations.

Figure 2A:
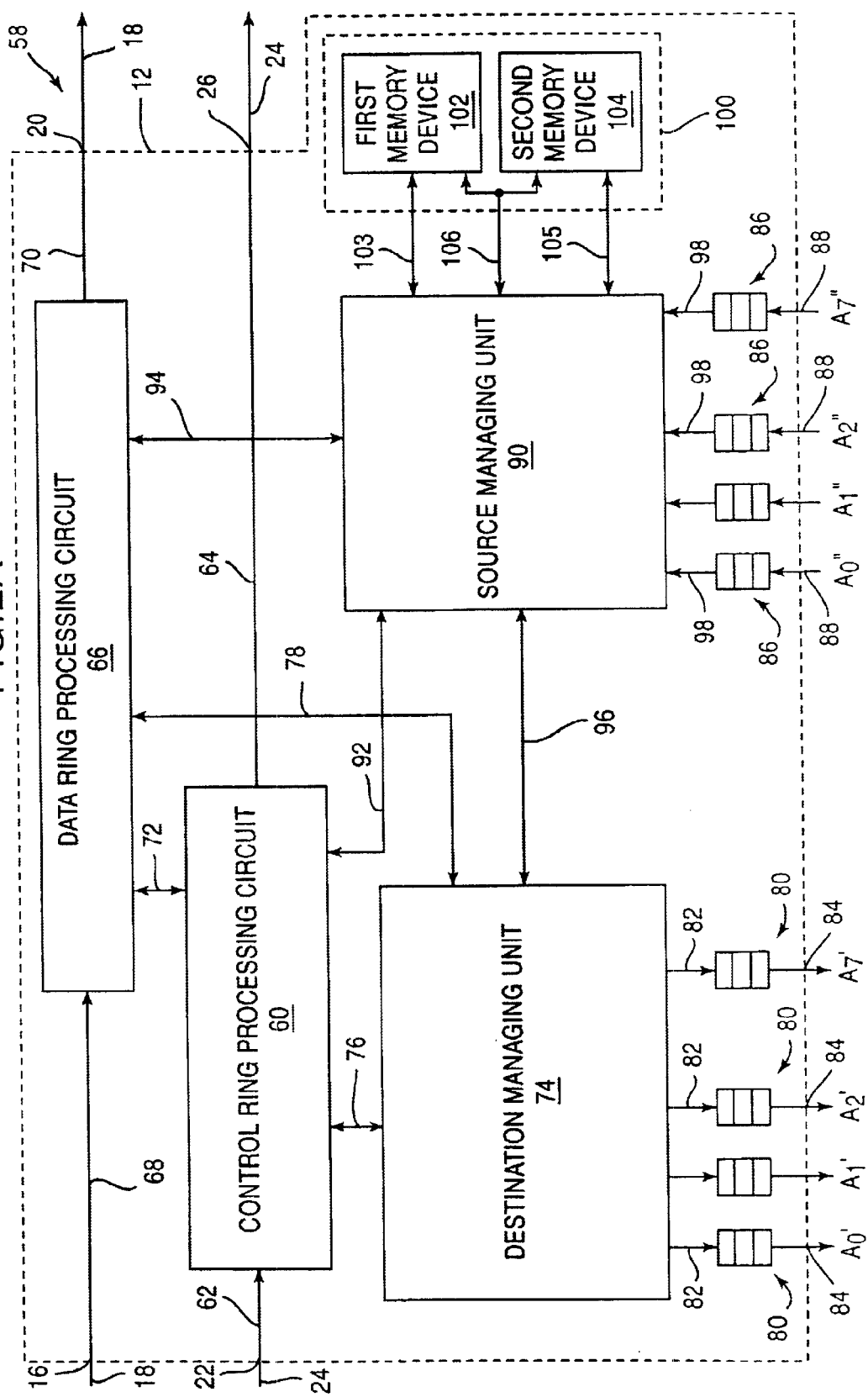
FIG. 2A is a generalized block diagram of a cut-through packet transfer switching device of the packet switching fabric of FIG. 1.

FIG. 2A shows a generalized block diagram illustrating components of one of the cut-through packet transfer switching devices 12 of the packet switching fabric 10 (FIG. 1) of the present invention. In one embodiment of the present invention, each of the switching devices 12 is implemented by an application specific integrated circuit (ASIC). In the depicted embodiment, the switching device 12 includes: a control ring processing circuit 60 for receiving control ring messages via the control ring input port 22 of the switching device as generally illustrated by a line 62, and for providing control ring messages to the control ring output port 26 of the switching device as generally illustrated by a line 64; a data ring processing circuit 66 for receiving data packet bursts and data ring messages via the data ring input port 16 of the switching device as illustrated by a line 68, and for providing data packet bursts and data ring messages to the data ring output port 20 of the switching device as illustrated by a line 70, and being communicatively coupled with the control ring processing circuit 60 as illustrated by a line 72; a destination managing unit 74 communicatively coupled with the control ring processing circuit 60 as illustrated by a line 76, and also being communicatively coupled with the data ring processing circuit 66 as illustrated by a line 78; a network interface circuit including a plurality of N transmit buffer queues 80 for receiving data packet bursts from the device destination managing sub-system 74 as generally illustrated by a plurality of N lines 82, and for providing packet data to a corresponding one of N network output ports 84 designated $A_0', A_1', \ldots, A_7'$, a plurality of N receive buffer queues 86 for receiving packet data via a corresponding one of a plurality of N network input ports 88 designated $A_0'', A_1'', \ldots, A_7''$; a source managing unit 90 communicatively coupled with the control ring processing circuit 60 as illustrated by a line 92, and also being communicatively coupled with the data ring processing circuit 66 and the device destination managing unit 74 as generally illustrated by lines 94 and 96 respectively, and being further coupled to receive packet data from the receive buffer queues 86 as illustrated by a plurality of lines 98; and a packet buffer 100 having a plurality of memory units.

The packet buffer 100 provides for storing data packets received via the network input ports 88. In the depicted embodiment, the packet buffer 100 includes: a first memory unit 102 communicatively coupled with the source managing unit 90 via a first memory unit link 103; and a second memory unit 104 communicatively coupled with the source managing unit 90 via a second memory unit link 105. In alternative embodiments of the present invention, the packet buffer 100 may include any number of memory units. Each of the memory units 102 and 104 is also communicatively coupled to receive control signals from the source managing unit 90 as generally illustrated by a line 106, the control signals for accessing specified packet data stored in the memory units 102 and 104. In one embodiment of the present invention, the external packet buffer 100 is not implemented on the ASIC which is used to implement the other components of the depicted switching device. Further, in the preferred embodiment, the memory units 102 and 104 of the external packet buffer 100 are implemented by dynamic RAM (DRAM) memory units.

The eight network input ports 86 designated $A_0'', A_1'', \ldots, A_7''$, and corresponding eight network output ports 80 designated $A_0', A_1', \ldots, A_7'$ are implemented by the eight network bi-directional ports 14 designated $A_0, A_1, \ldots, A_7$ (FIG. 1). In one embodiment, each of the eight transmit buffer queues 80, and each of the eight receive buffer queues 86, is implemented by a first in-first out buffer (FIFO) which is limited in size in order to increase the integration level of the ASIC used to implement the switching device 12. Because each of the eight transmit buffer queues 80 is limited in size, the transmit buffer queues 80 are too small to store a whole data packet. Because local area networks, such as ETHERNET, require uninterrupted transmission of a data packet to its destination node, the switching fabric 10 (FIG. 1) implements cut-through packet transfer through the lower and middle speed destination port transmit buffer queues 80 each of which is connected to either a 10 Mbps data communication link, or a 100 Mbps data communication link. In accordance with the cut-through packet transfer, while a data stream is being received at the data ring input 16 of the device 12 from an upstream source device, preceding data of the same data stream is simultaneously transmitted from the appropriate one of network output ports 84 so that the corresponding one of the transmit queues 80 does not overflow or underflow.

The control ring processing circuit 60 provides for receiving, developing, processing, and transmitting control messages including output queuing controlled packet transfer protocol messages between the devices via the control ring 25 (FIG. 1) in order to manage bandwidth resources of segments 18 of the data ring 19 (FIG. 1) and bandwidth resources of the memory unit links 103, 105 (FIG. 2A) as data is transferred via the data ring from source ones of the switching devices to corresponding destination ones of the switching devices. The output queuing controlled protocol messages are used to dynamically allocate source-destination channels prior to beginning data transfer from a source device to a destination device. The amount of bandwidth allocated for each source-destination channel is commensurate with the network link capacity of the destination network port. As further described below, an appropriate amount of bandwidth is allocated for each source-destination channel path before the corresponding packet transfer operation begins so that the packet transfer will not be disturbed during its network transmission.

Upon receiving a control message via the control ring input port 22, the control ring processing circuit 60 makes preliminary determinations including: reading a message type field of the message to determine the type of message received as further explained below; and comparing source and destination device ID fields of the message to a local device ID. When appropriate, as further explained below, the control ring processing circuit 60 transfers the message downstream via the control ring output port 26. Generally, if the destination of a control message received by a device is local, the control message is downloaded for local processing without being delivered downstream. Also generally, if the destination of a control message received by a device is not local, the message is propagated downstream. Each of the devices 12, 30, and 42 of the switching fabric 10 (FIG. 1) includes means for synchronizing and retiming messages received via its upstream device.

The source managing unit 90 is operative to develop pointer information for storing and reading each one of the received data packets to and from the packet buffer means, and also operative to develop destination identification information associated with each one of the received data packets. The destination identification information indicates an associated destination one of the network input ports 88 of an associated destination one of the switching devices 12 and 30 (FIG. 1). The received data packets include: transfer packets received at an associated source one of the devices that is different from the associated destination device; and local packets for which the associated destination network port is a port of the associated source device. The pointer information and destination identification information associated with each one of the local packets provide local announcement information serving as a local request for access to the associated destination network port. The pointer information and destination identification information associated with each one of the transfer packets provides transfer announcement information.

The control ring processing circuit 60 is responsive to the transfer announcement information, and operative to transmit and receive control messages to and from adjacent ones of the devices 12 and 30 (FIG. 1) via the control ring 25 (FIG. 1), the control messages including a packet location announcement message (PLA message) associated with each one of the received data packets, each PLA message carrying corresponding announcement information and providing a request to the associated destination switching device for access to the associated destination network port on behalf of the associated received data packet. The control ring processing unit 60 is also operative to provide received transfer announcement information in response to each received one of the announcement messages, the received transfer announcement information serving as a remote request for access to the associated destination network port.

The destination managing unit 74 is responsive to the local announcement information and the received transfer announcement information, and operative to arbitrate between competing ones of the local and remote requests for access to each of the network ports 84. The destination managing unit 74 is also operative to generate transfer notification information associated with selected ones of the transfer data packets.

The source managing unit 90 is operative to access the received data packets stored in the packet buffer unit 100 using pointer information associated with the received data packets. The announcement information associated with each one of the received data packets includes the associated pointer information, source identification information indicating an associated source one of the devices 12 and 30 (FIG. 1) that has received the associated received data packet, and destination identification information indicating the associated destination network port and the associated destination device.

The control messages further include a packet transfer notification message (PTN message) developed by the control ring processing unit 60 in response to the notification information. The PTN message is transferred to the selected source device at which the selected data packet is stored. The notification message indicates that the selected data packet has been granted access to the destination port associated with the selected data packet.

The destination managing unit 74 is also operative to monitor the availability of buffer space in each of the transmit buffer queues 80. The PTN message is transferred via the control ring processing circuit 60 after a determination by the output buffer manager that a destination one of the transmit buffer queues, that is coupled with the destination network port associated with the selected data packet, includes a threshold amount of available buffer space.

The control ring processing circuit 60 is responsive to the packet transfer notification information, and is operative to develop packet transfer notification messages (PTN messages) which are transmitted via the control ring 25 (FIG. 1) to corresponding source ones of the switching devices 12 and 30 (FIG. 1).

The source managing unit 90 is further operative to control the transmission of bursts of data from the packet buffer unit 100 to the data ring processing circuit 66 in response to channel parameter information received from the control ring processing circuit 60.

The control ring processing circuit 60 is responsive to a patrol message, carrying channel bandwidth information, received from an adjacent one of the switching devices as further explained below. The channel bandwidth information indicates bandwidths associated with corresponding ones of a plurality of channels dynamically allocated on the data ring 19 (FIG. 1). The control ring processing circuit 60 is operative to read and modify the channel bandwidth information in order to manage data transfer via the data ring 19 (FIG. 1) for the purpose of avoiding overflow of the data ring services. The channel bandwidth information carried by the patrol message includes: a plurality of data ring segment bandwidth parameters each being indicative of an amount of bandwidth currently available at a corresponding one of the data ring segments 18 (FIG. 1); and a plurality of memory unit link bandwidth parameters each being indicative of an amount of bandwidth currently available at a corresponding one of the memory unit links 103, 105 (FIG. 2A). The control ring message processing circuit 60 is operative to read selected ones of the bandwidth parameters in response to the packet transfer information provided by the destination managing unit 74. The selected bandwidth parameters, which are associated with a selected source-destination channel path, include: selected ones of a plurality of data ring segment bandwidth parameters associated with selected ones of the data ring segments 18 (FIG. 1) disposed between the source device and the destination device; and a selected one of a plurality of memory unit link bandwidth parameters associated selected ones of the memory units links 103 and 105 (FIGS. 2A and 2B) of the source device at which the selected data packet is currently being stored. The control ring message processing unit 60 is further operative to determine a maximum amount of bandwidth currently available for the corresponding source-destination channel path.

FIG. 2B shows a generalized block diagram illustrating components of the high speed network port switching device 30 of the packet switching fabric 10 (FIG. 1). In one embodiment of the present invention, the switching device 30 is implemented by an application specific integrated circuit (ASIC). The high speed network port switching device 30 is similar to the cut-through packet transfer switching devices 12 except that in order to accommodate the 1 Gbps network ports 32 (FIG. 1) for transmitting and receiving data packets via corresponding 1 Gbps ETHERNET links 33 (FIG. 1), the device 30 includes larger transmit buffer queues 110 which are capable of storing a whole data packet, and cut-through packet transfer is not performed. The structure and function of the high speed network port switching device 30 and the cut-through packet transfer switching device 12 (FIG. 3A) are practically identical, except with respect to the larger transmit buffer queues 110.

The depicted high speed network port switching device 30 includes: two transmit buffer queues 110 each having an input for receiving data from the destination managing unit 74 as illustrated by lines 114, and an output connected to a corresponding one of two network output ports 112 designated $D_0'$ and $D_1'$; and two receive buffer queues 118 each having an output for providing data to the source managing unit 90, and an input connected to a corresponding one of two high speed network input ports 120 designated $D_0''$ and $D_1''$. The two network output ports 112 designated $D_0'$ and $D_1'$, and the corresponding network input ports 120 designated $D_0''$ and $D_1''$ are implemented by the two high speed network ports 32 designated $D_0$ and $D_1$ (FIG. 1). Each of the receive buffer queues 118 is implemented by a FIFO which is not large enough to hold a whole data packet. Each of the transmit buffer queues 110 is implemented by a FIFO which is large enough to hold a whole data packet, and therefore cut-through packet transfer is not required for high speed destination port packet transfer operations wherein the destination port is a 1 Gbps output port 112 of the high speed network port switching device 30.

In addition to transferring packet data bursts, the data ring formed by the data ring segments 18 (FIG. 1) is used for transferring data ring messages transferred from one device to the next via the data ring. The data ring messages include: management information base event messages (MIB event messages) having received MIB events, a transit MIB events, or report events, system configuration messages, and status report messages generated by local event generators of the switching devices. Data structures for a data packet block header, a table convergence event, an IDLE data ring message, a Receive MIB event message, a Transmit MIB event message, a Command event, and a Report event for the described embodiment of the present invention are shown in the attached appendix.

When a data ring message is received by a device from upstream via the data ring, the data ring processing circuit 66 checks the header of the message and processes the data ring message accordingly. If the data ring message is a Received MIB event, a transit MIB event, or a report event, the message will be propagated downstream without modification via the data ring. If the received message is a command event for another device, the message will be propagated downstream without modification. If the received message is a command event for the receiving device, the data ring processing circuit 66 of the receiving device executes the command and terminates the message. If the data ring message received by a device from upstream via the data ring is a table convergence event message, the data ring processing circuit 66 of the receiving device will copy the event for table convergence execution, and the message will be propagated downstream by the data ring processing circuit 66 via the data ring without modification and terminated at the device that issued the message.

Figure 3A:
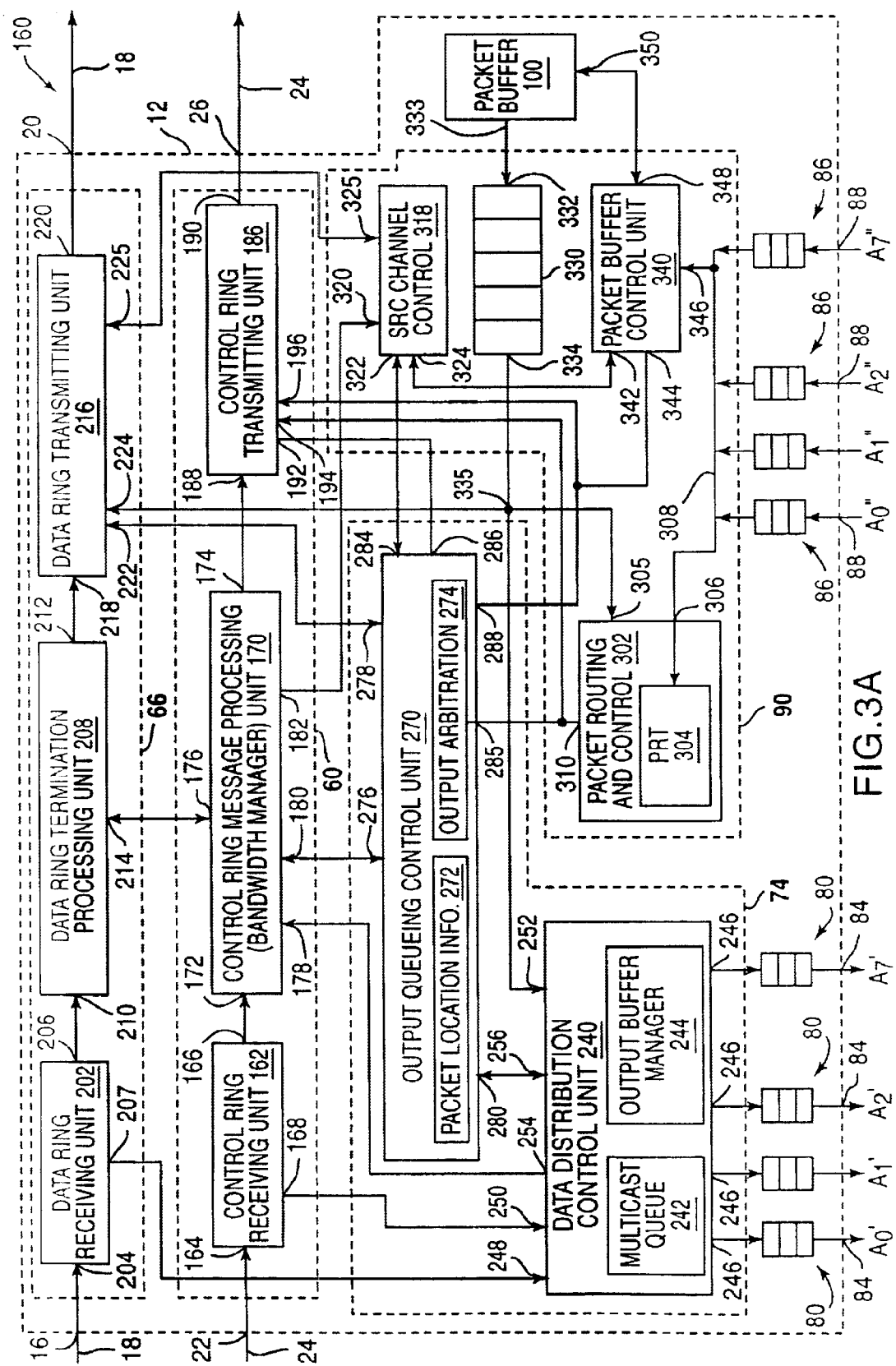
FIGS. 3A and 3B are detailed schematic circuit block diagrams of the switching devices of FIGS. 2A and 2B respectively, both of the devices including a data ring processing circuit, a control ring processing circuit, a source managing unit having a source channel control unit, and a destination managing unit.

FIG. 3A shows a detailed schematic circuit block diagram of components of one of the cut-through packet transfer switching devices 12 of the packet switching fabric 10 (FIG. 1). The control ring processing circuit 60 of the switching device 12 includes: a control ring receiving unit 162 having an input port 164 for receiving control messages via port 22 of the device 12, a message propagation port 166, and a termination port 168; a control message processing unit 170 having an input port 172 for receiving control messages from port 166 of the receiving unit 162, a message output port 174, and four additional ports 176, 178, 180, and 182 further explained below; and a control ring transmitting unit 186 having an input port 188 for receiving control messages from output port 174 of the control ring message processing unit 170, a message output port 190 for providing control messages to the control ring output port 26 of the switching device 12, a port 192 for receiving output queuing control message information from the destination managing unit 74 as further explained below, and a pair of ports 194 and 196 for receiving packet location announcement information from the source management unit 90 as further explained below.

The data ring processing circuit 66 of the switching device includes: a data ring receiving unit 202 having an input port 204 for receiving data messages and packet data bursts from a corresponding upstream one of the devices 12, 30, and 42 (FIG. 1) via corresponding one of the data ring segments 18 and via input port 16 of the switching device 12, a data propagation output port 206, and a data termination port 207 for providing bursts of packet data received via the data ring to the destination managing unit 74 as further explained below; a data ring termination processing unit 208 having a data input port 210 for receiving data and data ring messages from output port 206 of the data ring receiving unit 202, a data propagation port 212, and a port 214 communicatively coupled with port 176 of the control ring message processing unit 170; and a data ring transmitting unit 216 having a data input port 218 connected to output port 212 of the data ring termination processing unit 208, an output port 220 connected to the data ring output port 20 of the switching device 12, a port 222 communicatively coupled with the destination managing unit 74, a port 224 for receiving bursts of packet data from the packet buffer 100 via the source managing unit 90 as further explained below, and a port 225 further explained below.

The destination managing unit 74 of the switching device 12 includes: a data distribution control unit 240 having a multicast queue 242, an output buffer management unit 244, eight output ports 246 each providing data to an input of a corresponding one of the eight transmit buffer queues 80 of the switching device, an input port 248 for receiving bursts of packet data and data ring messages from output port 207 of the data ring receiving unit 202, an input port 250 for receiving control messages from port 168 of the control ring receiving unit 162, a port 252 for receiving bursts of data from the packet buffer 100 via the source managing unit 90 as further explained below, a port 254 communicatively coupled with port 178 of the control ring message processing unit 170, and a port 256 further explained below; and an output queuing control unit 270 having a packet location information unit 272 for storing packet location information indicating the locations of packet data stored in the packet buffers 100 of corresponding source ones of the devices 12 and 30 (FIG. 1) as further explained below, an output arbitration unit 274 for arbitrating between a plurality of requests on behalf of data packets for access to corresponding ones of the transmit buffer queues 86 as further explained below, a port 276 communicatively coupled with port 180 of the control ring message processing unit 170, a port 278 communicatively coupled with port 222 of the data ring transmitting unit 216, a port 280 communicatively coupled with port 256 of the data distribution control unit 240, a port 284 communicatively coupled with the source managing unit 90 as further explained below, a port 285 communicatively coupled with the source managing unit 90, a port 286 communicatively coupled with port 192 of the control ring transmitting unit 186, and a port 288 communicatively coupled with the source managing unit 90 as further explained below.

The source managing unit 90 of the switching device 12 includes: a packet routing and control unit 302 having a packet routing table 304 further explained below, a port 306 communicatively coupled with an output of each of the receive buffer queues 86 via a bus 308, and a port 310 communicatively coupled with port 194 of the control ring transmitting unit 186, and also communicatively coupled with port 285 of the output queuing control unit 270; a source channel control unit 318 having a port 320 communicatively coupled with port 182 of the control ring message processing unit 170, a port 322 communicatively coupled with port 284 of the output queuing control unit 270, a port 324 further explained below, and a port 325 communicatively coupled with port 225 of the data ring transmitting unit 216; an internal first-in first-out buffer (internal FIFO) 330 having an input port 332 for receiving bursts of packet data from a data output port of the packet buffer 100 via a path 333, and an output port 334 for providing bursts of packet data to port 252 of the data distribution control unit 240 and to port 224 of the data ring transmitting unit 216 via a node 335 that is communicatively coupled with port 305 of the packet routing control unit 302; and a packet buffer control unit 340 having a port 342 for receiving a channel data transfer signal from port 324 of the source channel control unit 318, a port 344 communicatively coupled with port 288 of the output queuing control unit 270 and also being communicatively coupled with port 196 of the control ring transmitting unit 186, and a port 348 communicatively coupled with a memory control port 350 of the packet buffer 100. As mentioned above, in the described embodiment, the packet buffer 100 includes two memory units 102 and 104 (FIG. 2A), and the path 333 includes the first and second memory unit links 103 and 105 (FIG. 2A).

An ETHERNET frame, or packet of data, includes header information specifying a source address of a source end node, and a destination address of a destination end node. ETHERNET frames typically have a length between 64 bytes and 1536 bytes. When a data packet is received via one of the network input ports 88, the data packet is initially buffered by the corresponding one of the receive buffer queues 86 and is passed to the bus 308. The packet routing and control unit 302, which is connected to the bus via its input 306, receives the header information of the packet including the ETHERNET destination address of the packet. Concurrently, the packet is transmitted to and stored in the external packet buffer 100 by the packet buffer control unit 340. The packet buffer control unit 340 includes a memory unit (not shown) for storing pointer address location information associated with each of the received data packets.

The packet routing and control unit 302 reads the destination address included in the header information of each data packet received via the network ports to determine a destination ID value indicating a destination one of the network ports of a destination one of the switching devices associated with the received data packet via the packet routing table 304 which provides ID codes of the destination device and destination port which is communicatively coupled to the destination end node specified by the destination address. The packet routing table 304 indicates a the destination network output port of the destination one of the devices 12 and 30 (FIG. 1) to which a particular packet must be forwarded to reach the end node indicated by the destination address specified by the packets header. The packet routing and control unit 302 reads the header information of the data packet including the source address and destination address, and performs a packet destination look up operation using the destination address. In an embodiment of the present invention, the packet routing and control unit 302 performs an automatic address learning function to create and continually update the packet routing table 304 using the source address of each data packet received by the unit 302. In alternative embodiments, the packet routing table 304 is created via manual entry, or via a combination of the manual entry and automatic address learning schemes.

The destination address specified by the header information of a data packet may be a multicast address which specifies multiple destination nodes, or a broadcast address which is specifies all destination nodes in the network. For multicast addresses, the packet routing table 304 may yield multiple destination port ID values for one or more destination devices. If the destination address of a data packet includes more than one of the network ports of a device receiving the message, the message will be terminated from the data ring and copied to the multicast queue 242. From the multicast queue 242, the data packet is distributed to selected ones of the transmit buffer queues 80 connected to the corresponding destination network ports for transmission.

If no match is found for a specified destination address in the packet routing table 304, the destination address is unknown. In this case, the packet may be broadcast to all ports (except the receiving port of the receiving device), or may be transferred only to an up-link port specified at the receiving port. When a match is found in the packet routing table 304 for a destination address specified by packet header information, it is then determined whether the destination address is connected to a network port of the receiving device, or to a network port of another device of the switching fabric 10 (FIG. 1) in order to determine whether a local or remote packet transfer operation is required.

The packet routing control unit 302 is further operative to append each of the data bursts, provided by the packet buffer 100 via the FIFO 330, with block header information including the destination ID value, and an end of packet indicator for indicating whether the data burst is a last data burst of the data packet.

The source managing unit 90 is also operative to control the transmission of bursts of data from a selected one of the memory units 102 and 104 (FIG. 2A) of the source device to the data ring processing circuit 66 via the corresponding one of the selected memory unit links 103 and 105 (FIG. 2A).

The packet buffer control unit 340 is operative to access data packets stored in the packet buffer unit 100, and is also operative to store pointer information indicating memory locations in the packet buffer unit 100 for storing the received data packets. The packet buffer control unit 340 is operative to generate a control signal at its port 348 for reading data bursts from the packet buffer 100 in response to the channel data transfer signal received at its port 342 from the source channel control unit 318.

The source channel control unit 318 is responsive to the received notification information, and operative to generate an initial channel data transfer signal associated with each one of the received notification messages. The channel data transfer signal is repeatedly activated a specified number of times in accordance with an associated initial channel rate value, the specified number being determined based on the associated initial channel credit value. The packet buffer control unit 340 is responsive to the channel data transfer signals, and operative to read the specified number of data bursts of an associated selected data packet, indicated by the packet location pointer information, from the packet buffer unit 100 in accordance with an associated channel rate value. The specified number of bursts are indicated by an initial credit value received from the destination managing unit 74 of a corresponding destination one of the devices 12 and 30 (FIGS. 2A and 3A).

The data distribution control unit 240 is operative to read the header information of the data bursts received from the packet buffer of the associated source device, and distribute the data bursts to appropriate ones of the network output ports 84. The multicast queue 242 of the data distribution control unit 240 is operative to distribute multicast data bursts, having header information specifying multicast addresses, to corresponding multiple ones of the transmit queue buffers for transmission to multiple destination nodes.

The output buffer manager 244 of the data distribution control unit 240 is operative to monitor the availability of buffer space in corresponding ones of the transmit buffer queues 80. The output buffer manager 244 is also operative to determine a number of blocks of buffer space available at each of the transmit buffer queues, each of the available blocks providing buffer space for receiving a burst of packet data from the destination managing unit 74. The packet transfer notification information further includes an initial credit value indicative of a number of available blocks at the transmit buffer queue coupled with the destination network port associated with the selected data packet.

A complete description of the functions provided by each of the illustrated components of the cut-through packet transfer switching devices 12 is provided below with respect to a series of flow diagrams.

Figure 3B:
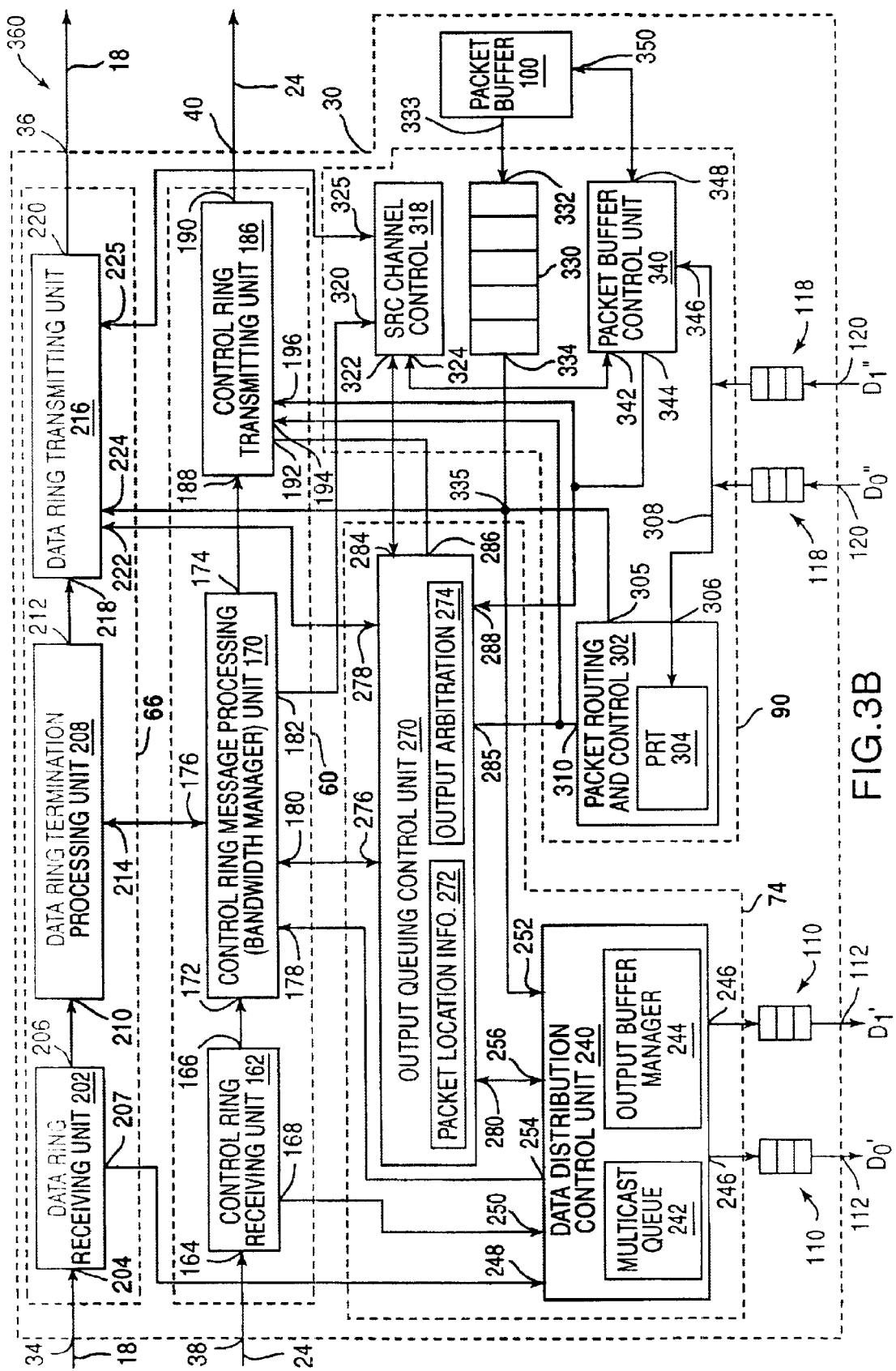

FIG. 3B shows a detailed schematic circuit block diagram of components of the high speed network port switching device 30 of the packet switching fabric 10 (FIG. 1). The high speed network port switching device 30 is similar to the cut-through packet transfer switching devices 12 (FIG. 3A), and includes all of the same components except that in order to accommodate the 1 Gbps network ports 32 (FIG. 1) for transmitting and receiving data packets via corresponding 1 Gbps ETHERNET links 33, the larger transmit buffer queues 110 capable of storing a whole data packet are used, and cut-through packet transfer is not performed. In an embodiment of the present invention, the switching device 30 is implemented by an application specific integrated circuit (ASIC). The functions of each of the components of the device 30 are very similar as further described below.

As mentioned above, in accordance with inter-device packet transfer operations, the control ring message processing unit 170 is operative to provide packet transfer notification information to the source channel control unit 318 in response to receiving a PTN message via the control ring receiving unit 186 from a corresponding remote source one of the devices 12 and 30 (FIG. 1). The packet transfer notification information includes: a destination ID value indicative of a corresponding destination switching device and destination port associated with a corresponding data packet to be transmitted via a corresponding channel; address location pointer values indicative of a memory address of a corresponding selected data packet stored in the local packet buffer 100 (FIG. 2A), the selected data packet having been selected by the output queuing control unit 270 of the corresponding destination device for access to the corresponding destination port; a corresponding initial credit value indicative of a corresponding initial number of authorized data bursts of the selected data packet to be read from the local packet buffer 100 and transmitted to the corresponding destination device; and a corresponding initial rate value indicative of a corresponding initial rate for transmitting the authorized bursts of the selected data packet.

In the described embodiment, the total bandwidth available in transmitting data and data ring messages via the data ring segments of the data ring 19 (FIG. 1) is 3.2 Gbps. Therefore, the data ring may support up to thirty two 100 Mbps channels. Data is transmitted from output port 220 the data ring transmitting unit 216 in bursts of 64 bytes (or 512 bits) per second. For a data channel operating at 100 Mbps, one bit is transmitted in 10 nanoseconds, and one burst is transmitted in 5120 nanoseconds. In this embodiment, the period of the channel rate timer may be 5120 nanoseconds.

For the high speed network port switching device 30, the maximum source-destination data ring channel bandwidth is not reserved all at once because the burden on the total bandwidth resources of the data ring would cause a degradation in the overall performance of the switching fabric. Therefore, for packet transfer operations wherein the destination port is one of the 1 Gbps network ports 112 (FIG. 2B), an initial source-destination channel is set up and its bandwidth is thereafter increased in incremental steps in accordance with the output queuing controlled protocol as further explained below. In the described embodiment, the bandwidth resolution of the source-destination channels for high speed destination port packet transfer operations is 100 Mbps and in order to establish a channel having the maximum channel bandwidth, the switching fabric sets up an initial channel having a 100 Mbps bandwidth, and then increments the bandwidth from 100 Mbps to the maximum channel bandwidth in incremental steps as further explained below.

As mentioned above, in accordance with each inter-device packet transfer operation, a packet transfer notification message (PTN message) is transferred form a destination device to a corresponding source device, the PTN message including packet transfer notification information including a corresponding destination ID value, a corresponding address location pointer value, a corresponding initial credit count value, and a corresponding initial rate value. The PTN message is received at the control ring message processing unit 170 (FIG. 2A) of the corresponding source switching device, and the corresponding packet transfer notification information is provided to the source channel control unit 318. The packet transfer notification information is used to set up a channel for transferring a data packet from the source switching device to the corresponding destination switching device via a source channel path including corresponding ones of the data ring segments 18 (FIG. 1) disposed between the source and destination devices, and a corresponding one of the memory unit links 103, 105 (FIG. 2A).

For local packet transfer operations, packet transfer notification information, provided to the source channel control unit 318 (FIG. 2A) by the local output queuing control unit 270, is used to set up a channel for transferring a data packet from the local packet buffer 100 (FIG. 1) to the corresponding local destination network port via a source channel path including the one of the memory unit links 103, 105 (FIG. 2A).

A complete description of the functions provided by each of the illustrated components of the switching devices 30 is provided below with respect to a series of flow diagrams.

Figure 3C:
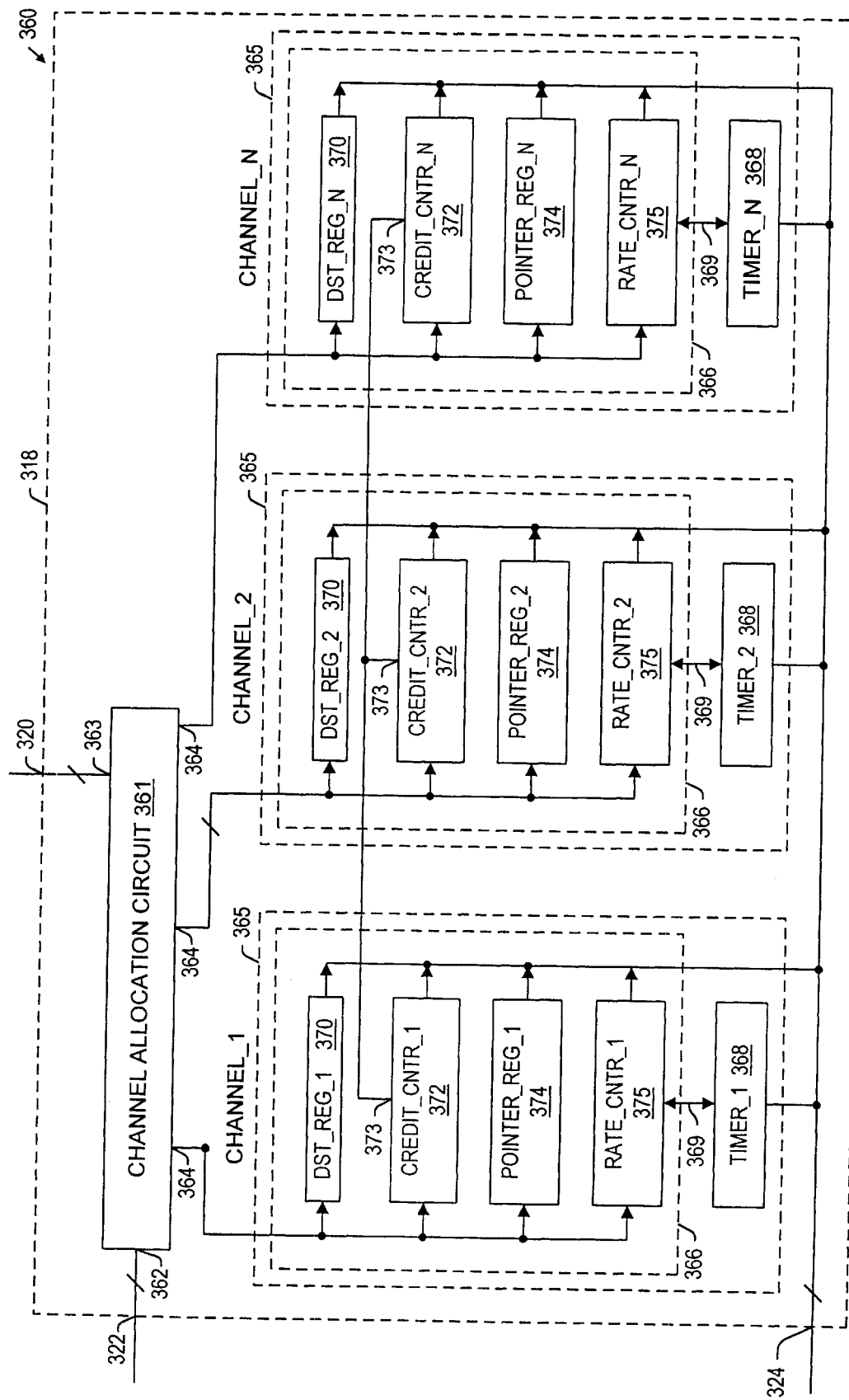
FIG. 3C is a circuit block diagram depicting further details of the source channel control unit of one of the switching devices of FIGS. 3A and 3B.

FIG. 3C shows a schematic circuit block diagram depicting further details of the source channel control unit 318 (FIGS. 3A and 3B) at 360. In the depicted embodiment, the source channel control unit 318 includes a channel allocation circuit 361 for allocating packet transfer notification information to a corresponding one of a plurality of channel memory units in order to manage channel information associated with associated ones of the source-destination channel paths. The channel allocation circuit 361 includes: a first input 362 for receiving local packet transfer notification information, associated with a selected local packet, from the local output queuing control unit 270 (FIG. 3A) via port 322 of the source channel control unit; a second input 363 for receiving remote packet transfer notification information, associated with a selected transfer packet, from the control ring message processing unit 170 (FIG. 3A) via port 320 of the source channel control unit; and a plurality of outputs 364 each for providing selected local and remote packet transfer notification information to a corresponding one of a plurality of N channel control circuits 365 via a corresponding bus. The channel allocation circuit 361 includes logic for determining an available one of the channel control circuits 365, and multiplexing logic for routing packet transfer notification information to the corresponding selected ones of the channel control circuits 365.

Each of the channel control circuits 365 includes: a plurality of N channel parameter memory units 366 designated CHANNEL_1, CHANNEL_2, ... CHANNEL_N, each being operative to store and manage a corresponding set of channel parameters associated with a corresponding source-destination channel dynamically allocated on corresponding ones of the data ring segments 18 (FIG. 1) and corresponding ones of the memory unit links 103 and 105 (FIGS. 2A and 2B); and a plurality of N channel rate timers 368 designated TIMER_1, TIMER_2, ... TIMER_N each being communicatively coupled with a corresponding one of the memory units 366 via a corresponding connection 369 as further explained below.

Each of the channel parameter memory units 366 provides for storing and managing a corresponding set of channel parameters associated with a corresponding one of the source-destination channels that is initialized by the source managing unit 90 (FIG. 3A) in response to packet transfer notification information associated with a selected one the data packets, the notification information being received from the local output queuing control unit 270 (FIG. 3A) via port 322 if the corresponding packet transfer operation is local, or from the control ring message processing unit 170 (FIG. 3A) via port 320 if the corresponding packet transfer operation is an inter-device transfer operation. As mentioned above, the packet transfer notification information includes a corresponding destination ID value, corresponding address location pointer values, a corresponding initial credit count value, and a corresponding initial channel rate value.

In the depicted embodiment, each of the channel parameter memory units 366 includes: an associated one of a plurality of N destination ID registers 370 designated DST_REG_1, DST_REG_1, ... DST_REG_N, each having an input for receiving a corresponding destination identification value; and an associated one of a plurality of channel credit counter units 372 designated CREDIT_CTR_1, CREDIT_CTR_2, ... CREDIT_CTR_N, each having a first input for receiving corresponding initial and incremental credit count values indicative of corresponding initial and incremental numbers of credits, or data bursts to be read from the local packet buffer 100 (FIG. 2A). Each of the channel credit counter units 372 also includes a count input 373 for receiving a count down signal from port 342 of the packet buffer control unit 340 (FIG. 3A) via the channel allocation circuit 361 and via port 324 of the source channel control unit. The count down signal is asserted each time a corresponding data burst is read from the local packet buffer 100 (FIG. 3A) of the source device. Each of the channel credit counter units 372 is operative to decrease the corresponding stored channel credit count value in response to the count down signal each time a corresponding data burst is read from the packet buffer 100 (FIG. 3A).

Each of the channel parameter memory units 366 further includes an associated one of a plurality of N pointer registers 374 designated POINTER_REG_1, POINTER_REG_2, ... POINTER_REG_N. Each of the pointer registers 374 includes: an input for receiving a corresponding address location pointer value, indicative of corresponding memory address of a corresponding selected data packet stored in the local packet buffer 100 (FIG. 3A), via the channel allocation circuit; and an output for providing the stored pointer value via port 324 of the source channel control unit to input 342 of the packet buffer control unit 340 (FIG. 2A). The address location pointer value may be provided from the local output queuing control unit 270 (FIG. 3A) via port 322 if the corresponding packet transfer operation is local, or from the control ring message processing unit 170 (FIG. 3A) via port 320 if the packet transfer operation is an inter-device transfer operation.

Each of the channel parameter memory units 366 further includes a corresponding one of a plurality of N channel rate counter registers 375 designated RATE_CNTR_1, RATE_CNTR_2, ... RATE_CNTR_N, each having an input for receiving corresponding initial and incremental channel rate values indicative of corresponding initial and incremental channel rates. The incremental channel rate value, received via a corresponding PTN message as further explained below, is indicative of a period for transmitting bursts of packet data from the packet buffer 100 (FIG. 3A) via the FIFO 318. The initial and incremental channel rate values may be provided from the local output queuing control unit 270 (FIG. 3A) via port 322 if the corresponding packet transfer operation is local, or from the control ring message processing unit 170 (FIG. 3A) via port 320 if the packet transfer operation is an inter-device transfer operation. Each of the channel rate counter registers 375 is operative to decrease the corresponding stored channel rate value in response to an incremental channel rate signal because the channel rate value is indicative of the period between bursts which is inversely proportional to the channel rate.

Each of the channel rate timers 368 includes an input for receiving a corresponding one of the channel rate values from the output of a corresponding one of the channel rate registers 375 via the corresponding path 373. Each of the channel rate timers 368 is operative to generate the corresponding channel data transfer signals which is provided via port 324 of the source channel control unit to port 342 of the packet buffer control unit 340 (FIG. 3A). In response to the channel rate control signal, the packet buffer control unit 340 (FIG. 3A) reads corresponding bursts of packet data from the packet buffer in accordance with the period indicated by the channel rate value currently stored in the corresponding channel rate register 375.

Figure 4A:
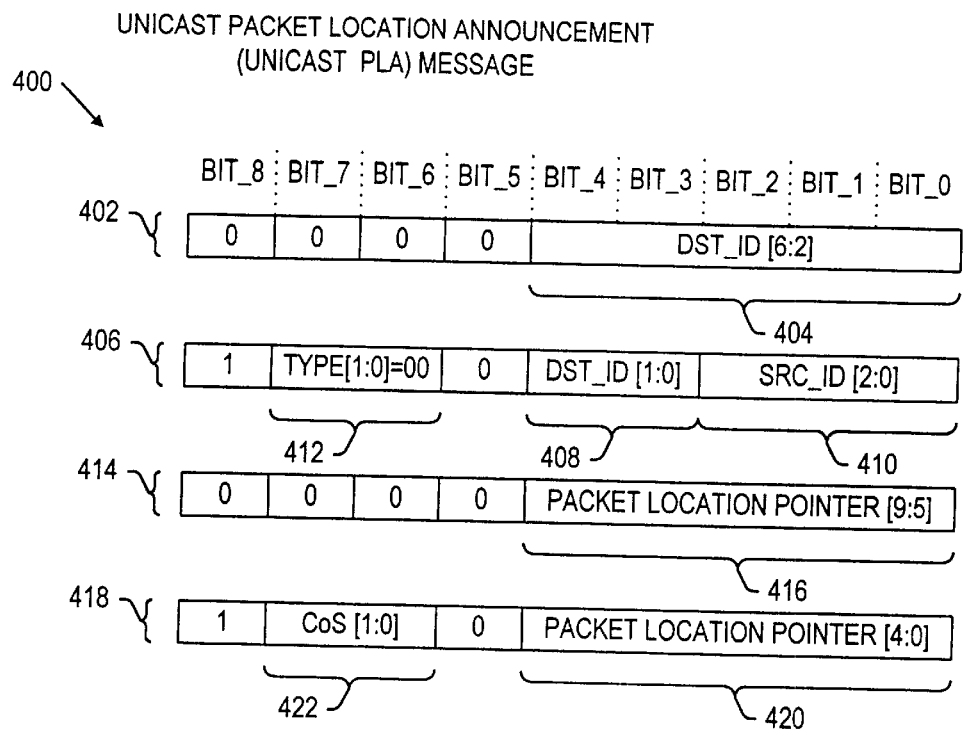
FIGS. 4A through 4E are block diagrams depicting field structures of control messages transmitted via the control ring of FIG. 1 for implementing the output queuing controlled packet transfer protocol of the present invention.

FIG. 4A shows a block diagram depicting a field structure at 400 of a unicast packet location announcement message (unicast PLA message) used in the output queuing controlled packet transfer protocol of the present invention. The unicast PLA message 400 includes 36 bits and is transmitted from a source one of the switching devices 12 and 30 (FIG. 1) to a corresponding destination one of the switching devices via the control ring 25 of the switching fabric 10 (FIG. 1). The unicast PLA message 400 provides a request to a destination device, on behalf of a data packet received at a corresponding source device, for access to a corresponding destination output port of the destination device.

The unicast PLA message 400 includes: a first nine-bit string 402 having a first destination ID field 404 for carrying five higher order bits of a seven-bit destination device ID value for indicating a corresponding destination device and destination port associated with a corresponding packet transfer operation; a second nine-bit string 406 having a second destination ID field 408 for carrying two lower order bits of the destination device ID value, a source device ID field for carrying a corresponding three-bit source device ID value indicating the source device associated with the corresponding packet transfer operation, and a unicast PLA message identification field 412 for carrying a two-bit message ID value of "00" for identifying the message as a unicast PLA message; a third nine-bit string 414 having a first packet location pointer field 416 for carrying five higher order bits of a packet location address information value for specifying the location of the corresponding data packet in the packet buffer 100 (FIG. 3A) of the corresponding source device; and a fourth nine-bit string 418 having a second packet location pointer field 420 for carrying five lower order bits of the ten-bit packet location address information value, and a service class field 422 for carrying a two-bit service class value that is indicative of service class information carried by the corresponding packet.

Figure 4B:
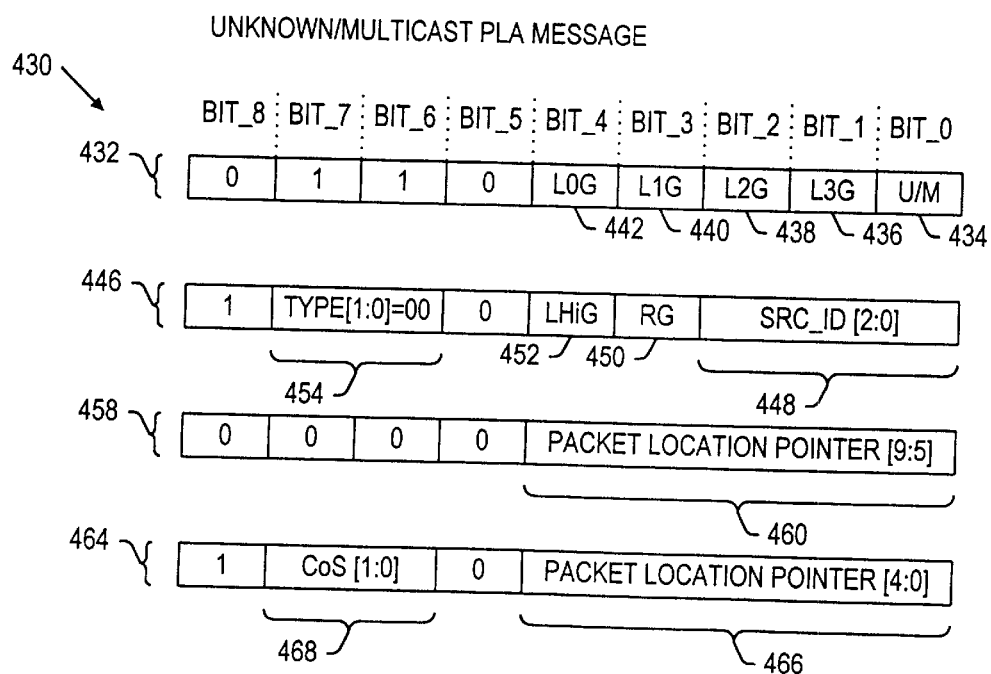

FIG. 4B shows a block diagram depicting the field structure of an unknown/multicast packet location announcement message (unknown/multicast PLA message) used in the output queuing control protocol of the present invention. The message 430 includes 36 bits and is transferred from a source one of the switching devices to a corresponding destination one of the devices via corresponding ones of the nine-bit control ring segments 24 (FIG. 1) during four cycles of the control ring 25 (FIG. 1). The unknown/multicast PLA message 400 provides a request to a plurality of destination devices, on behalf of a data packet received at a corresponding source device and having a multicast destination address or an unknown destination address, for access to a corresponding plurality of destination network ports of the destination device.

The message 430 includes: a first nine-bit string 432 having a one-bit unknown/multicast field 434 for storing a value indicative of whether the destination(s) associated with the corresponding packet is specified as a multicast destination address or an unknown address, and a destination bit map having four destination device ID fields 436, 438, 440, and 442 each carrying a corresponding single bit indicative of whether a corresponding one of the N=4 switching devices 12 and 30 (FIG. 1) is designated as one of the destination devices of the multicast data packet; a second nine-bit string 446 having a source device identification field 448 for carrying a three-bit source device ID value indicative of the source device at which the corresponding packet has been received, a gateway destination field 450 for carrying a one-bit value indicative of whether the corresponding multicast destination addresses include another one of the packet switching fabrics 10 (FIG. 1) connected to the fabric 10 (FIG. 1) via a gateway (not shown) which may be communicatively coupled to the data ring and the control ring 25 (FIG. 1) of the packet switching fabric, a local high function device destination field 452 for carrying a single bit indicative of whether the corresponding multicast destination addresses include a corresponding high function device (e.g., the CPU 51 of FIG. 1), and a message type ID field 454 carrying an unknown/unicast PLA message ID value which is equal to "00"; a third nine-bit string 458 having a first packet location pointer field 460 for carrying five higher order bits of an associated ten-bit packet location pointer address value indicative of the location of a corresponding data packet in a packet buffer 100 (FIG. 3A) of the corresponding source device; and a fourth nine-bit string 464 having a second packet location pointer field 466 for carrying five lower order bits of the packet location address pointer information value, and a service class field 468 for carrying a service class value associated with the corresponding packet.

Figure 4C:
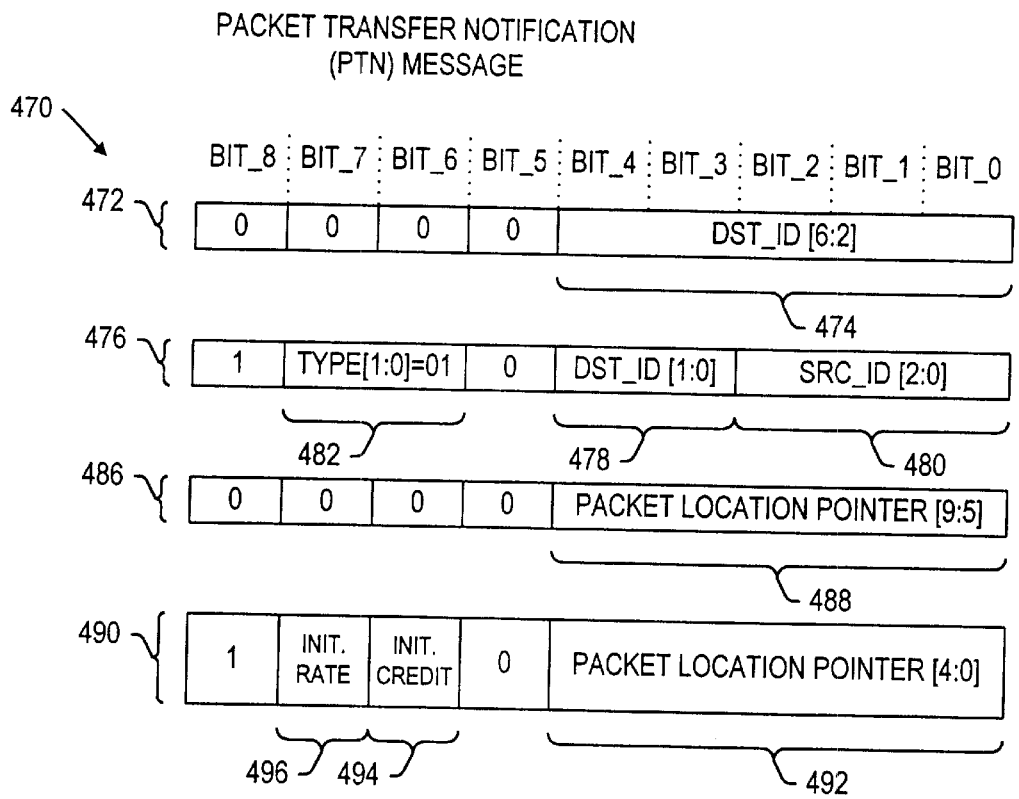

FIG. 4C shows a block diagram depicting the field structure of a packet transfer notification message (PTN message) used in the output queuing protocol of the present invention. The PTN message 470 includes 36 bits and is transmitted from a destination one of the switching devices 12 and 30 (FIG. 1) to a corresponding source one of the switching devices via corresponding ones of the nine-bit control ring segments 24 (FIG. 1) of the control ring during four cycles of the control ring. The PTN message 470 is developed by the destination device in response to a PLA message previously sent by the corresponding source device to the destination device, and is transmitted by the destination device after a set of packet transfer operation criteria has been determined to be satisfied by the destination device. The packet transfer operation criteria includes: selection of the corresponding data packet, as indicated by the corresponding previous PLA message, by the output arbitration unit 274 (FIG. 3A) of the destination device; a determination by the output buffer managing unit 244 (FIG. 3A) of the destination device that there is sufficient available output buffer space at a corresponding one of the transmit buffer queues 80 (FIG. 3A) or 110 (FIG. 3B); and a determination by the control ring message processing unit 170 of the destination device that a sufficient amount of bandwidth resources is available on the data ring 19 (FIG. 1) of the packet switching fabric.

The PTN message 470 includes: a first nine-bit string 472 having a first destination ID field 474 for carrying five higher order bits of a destination device ID value indicating a corresponding destination device and destination port associated with the corresponding packet transfer operation; a second nine-bit string 476 having a second destination ID field 478 for carrying two lower order bits of the destination device ID value, a source device ID field 480 for carrying a three-bit source device ID value indicative of an associated source one of the switching devices 12 and 30 (FIG. 1) associated with the corresponding packet transfer operation, and a PTN message type field 482 for carrying a two-bit PTN message ID value equal to "01"; a third nine-bit string 486 having a first packet location pointer field 488 for carrying five higher order bits of a ten-bit packet location pointer value indicative of a location of a corresponding data packet in a packet buffer 100 (FIG. 3A) of the corresponding source device; and a fourth nine-bit string 490 having a second packet location pointer field 492 for carrying five lower order bits of the packet location address pointer information value, an initial credit value field 494 for carrying a one-bit initial chase credit value, and an initial channel rate field 496 for carrying a one-bit initial rate value.

The initial credit field 494 may carry a value of zero or one. In an embodiment, an initial credit value of one indicates that a corresponding one of the transmit buffers 80 (FIG. 3A) and 110 (FIG. 3B) includes at least one block of available space which is sufficient to accommodate at least one data burst. A single credit is associated with available space for one burst of a packet data. As mentioned above, the output buffer manager 244 (FIG. 3A) of the data distribution control unit 240 (FIG. 3A) monitors the availability of buffer space for each of the transmit buffers 80 (FIG. 3A) and 110 (FIG. 3B). An initial credit value of zero indicates that there are at least two blocks of available space sufficient for accommodating two bursts of packet data at the corresponding one of the transmit buffers. Because, in the depicted embodiment, the PTN message 470 includes a single bit to indicate the initial credit value, a maximum of two credits may be initially provided to the corresponding source device via the PTN message. As further explained below, an incremental credit transfer (ICT) message is sent subsequently in order to increase the credit value to a corresponding maximum credit value, that is the actual number of bursts which may be provided to the corresponding one of the transmit buffers in the destination device at the current time. As an example, the output buffer manager unit 244 (FIG. 3A) may determine that a selected one of the transmit buffer queues 80 (FIG. 3A) currently includes 3 blocks of available space. Therefore, the current maximum credit value associated with the selected transmit buffer queue is equal to 3. In this case, the initial credit field 494 of a PTN message, associated with a packet destined for the selected transmit buffer queue, carries a value of zero to indicate that there are at least two available blocks at the selected transmit buffer queue, and an ICT message sent immediately after the PTN message carries an incremental credit value of one to increase that total credit value to the maximum value of 3. Note that there is no latency between the ICT message because the ICT message is sent via the control ring 25 (FIG. 1) from the destination device to the source device while the first one or two bursts are transferred from the source device to the destination device via the data ring. Therefore further bursts may be transmitted from the source device to the destination device, in response to the ICT message, in a pipelined manner.

Figure 4D:
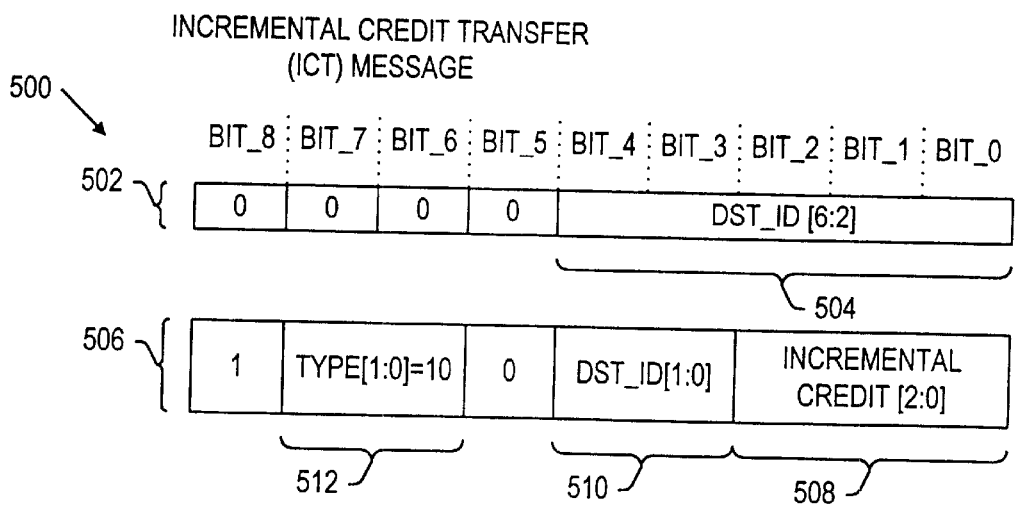

FIG. 4D shows a block diagram depicting the field structure of an incremental credit transfer message (ICT message) at 500, the ICT message 500 being used in the output queuing control protocol of the present invention. The ICT message 500 includes 18 bits and is transmitted from a destination one of the switching devices 12 and 30 (FIG. 1) to a source one of the switching devices via the control ring 25 (FIG. 1) during two cycles of the control ring. The ICT message 500 indicates to the corresponding source device that a credit value, indicative of a number of bursts to be transferred from the source device to the destination device via the data ring and initialized by a corresponding previous PTN message 470 (FIG. 4C) is to be increased.

The ICT message 500 includes: a first nine-bit string 502 having a destination ID field 504 for carrying five higher order bits of a destination ID value; and a second nine-bit string 506 having an incremental credit field 508 for carrying a corresponding three-bit incremental credit value for instructing the source device to increase the associated channel credit for the associated packet transfer operation by the corresponding incremental credit value, a second destination ID field 510 for carrying two lower order bits of the destination ID value, and an ICT message type field 512 for carrying an ICT message ID value of "10" indicating that the message 500 is an ICT message.

Figure 4E:
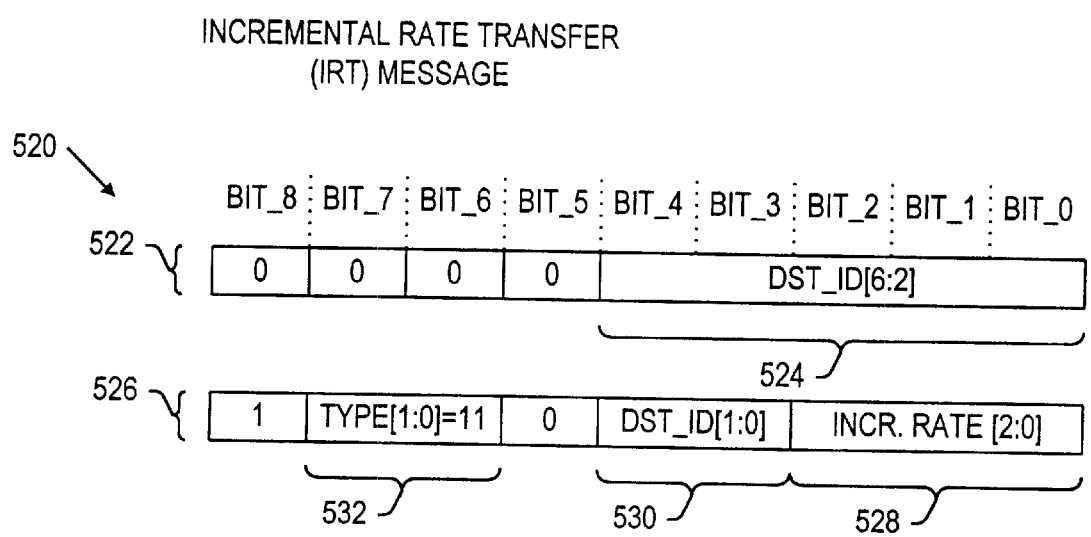

FIG. 4E shows a block diagram illustrating a field structure of an incremental rate transfer message (IRT message) 520 used in the output queuing controlled packet transfer protocol of the present invention. The IRT message 520 includes 18 bits and is transmitted from a destination one of the switching devices 12 and 30 (FIG. 1) to a corresponding source one of the switching devices via corresponding ones of the nine-bit control ring segments 24 (FIG. 1) during two cycles of the control ring of the packet switching fabric. The IRT message 520 indicates to the corresponding source device that the corresponding channel rate value, initialized by a corresponding previous PTN message 470 (FIG. 4C), is to be increased.

The IRT message 520 includes: a first nine-bit string 522 having a first destination ID field 524 for carrying five higher order bits of a destination ID value indicative of the corresponding destination device; and a second nine-bit string 526 having an incremental rate field 528 for carrying a three-bit incremental rate value for instructing the source device to increase the associated channel rate for the associated packet transfer operation by the corresponding incremental rate value, a second destination ID field 530 for carrying two lower order bits of the destination ID value, and an IRT message type field 532 for carrying an IRT message ID value of "11" indicating that the message 520 is an IRT message.

FIG. 5A shows a block diagram depicting a source identification mapping table at 540 providing for mapping source identification values carried by the control ring messages, data ring messages, and data bursts (transmitted via the control ring 25 (FIG. 1) and data ring 19 (FIG. 1)) to corresponding source ones of the devices 12, 30, and 42 (FIG. 1) and corresponding source ones of the network input ports 88 (FIG. 2A) of the cut through packet transfer switching devices and the network input ports 120 (FIG. 2B) of the high speed network port switching devices.

The source identification mapping table 540 includes: a first source device mapping table portion 542 providing a mapping between an eight-bit source identification value and corresponding ones of eight source ports of a first source one of the switching devices 12 and 30 (FIG. 1); a second source device mapping table portion 544 providing a mapping between an eight-bit source identification value and corresponding ones of eight source ports of a second source switching device; a third source device mapping table portion 546 providing a mapping between an eight-bit source identification value and corresponding ones of eight source ports of a third source switching device; a fourth source device mapping table portion 548 providing a mapping between an eight-bit source identification value and corresponding ones of eight source ports of a fourth source switching device; a local high function device mapping table portion 552 providing a mapping between an eight-bit source identification value and corresponding ones of eight source ports of a local high function device (e.g., the dedicated management device 42 of FIG. 1); a remote high function device mapping table portion 554 providing mapping between an eight-bit source identification value and corresponding ones of eight source ports of a remote high function device; a gateway device mapping table portion 556 providing mapping between an eight-bit source identification value and corresponding ones of sixteen ports of a gateway device; a trunk mapping table portion 558 providing mapping between an eight-bit source identification value and corresponding ones of four trunks of a corresponding source one of the devices 12, 30, and 42 (FIG. 1); and a multicast mapping table portion 560 providing mapping between an eight bit multicast source ID value and 128 multicast groups.

FIG. 5B shows a block diagram depicting a destination identification mapping table at 570, providing for mapping the destination identification values carried by the control ring messages, data ring messages, and data bursts (transmitted via the data ring 19 and control ring 25 (FIG. 1)) to corresponding destination ones of the devices 12, 30, and 42 (FIG. 1) and corresponding destination ones of the network output ports 84 (FIG. 2A) of the cut through packet transfer switching devices and the network output ports 112 (FIG. 2B) of the high speed network port switching devices.

The destination identification mapping table 570 includes: a first destination mapping table portion 572 providing mapping between an eight-bit destination ID value and corresponding ones of eight destination ports of a first destination one of the switching devices 12 and 30 (FIG. 1), wherein mapping is specifically provided for 10 Mbps destination ports and 100 Mbps destination ports; a second destination mapping table portion 574 providing mapping between an eight-bit destination ID value and corresponding ones of eight destination ports of a second destination one of the switching devices 12 and 30 (FIG. 1), wherein mapping is specifically provided for 10 Mbps destination ports and 100 Mbps destination ports; a third destination device mapping table portion 576 providing mapping between an eight-bit destination identification value and corresponding ones of eight destination ports of a third destination one of the switching devices 12 and 30 (FIG. 1), wherein mapping is specifically provided for 10 Mbps destination ports and 100 Mbps destination ports; a fourth device mapping table portion 578 providing mapping between an eight-bit destination ID value and corresponding ones of eight destination ports of a fourth destination one of the switching devices 12 and 30 (FIG. 1), wherein mapping is specifically provided for 10 Mbps destination ports and 100 Mbps destination ports; a local high function device mapping table portion 580 providing a mapping between an eight-bit destination ID value and corresponding ones of eight destination ports of a local high function device (e.g., the dedicated management device 42 of FIG. 1); a remote high function device mapping table portion 582 providing mapping between an eight-bit destination identification value and corresponding ones of eight destination ports of a remote high function device; a gateway device mapping table portion 584 providing mapping between an eight-bit destination identification value and corresponding ones of sixteen ports of a gateway device; and a trunk mapping table portion 584 providing mapping between an eight-bit destination identification value and corresponding one of four trunks of a corresponding destination ones of the devices 12, 30, and 42 (FIG. 1).

FIG. 6 shows a block diagram depicting a field structure of a channel resource patrol message, or patrol message, at 600. In an embodiment, the patrol message 600 is transmitted via the 33-bit wide data ring 19 (FIG. 1) of the switching fabric 10 (FIG. 1). In an alternative embodiment of the present invention, the patrol message 600 is transmitted via the control ring of the switching fabric 10 (FIG. 1). As further explained below, the patrol message 600 includes data ring channel bandwidth information including a plurality of channel bandwidth parameters indicative of available bandwidth resources for transmitting data packets between corresponding source and destination ones of the devices 12, 30, and 42 via the data ring of the switching fabric 10 (FIG. 1). In the depicted embodiment, the patrol message 600 includes three cycle strings, each cycle string having 33 bits each being transmitted during a corresponding cycle of the data ring 19 (FIG. 1).

The bandwidth parameters of the patrol message 600 are managed by the control ring message processing unit 170 (FIG. 3A) of the control ring processing circuit in accordance with a channel rate reservation process. The control ring message processing unit 170 (FIG. 3A) is operative to read the patrol message 600, and is also operative to adjust the bandwidth values of the patrol message in response to information received from the destination managing unit 74 (FIG. 3A) and the source managing unit 90 (FIG. 3A) of the destination and source devices 12, 30, and 42 (FIG. 1) of the switching fabric.

The patrol message 600 includes a first cycle string 602 for carrying bandwidth parameters indicative of bandwidth available in data paths associated with high function devices of the data ring of the packet switching fabric. The first cycle string 602 of the patrol message includes: a channel resource patrol field 604 for carrying a three-bit patrol message ID value equal to "000" indicating that the message 602 is the patrol message; a high function device link bandwidth field 606 for carrying a five-bit value indicative of a current amount of bandwidth available at a corresponding data ring segment providing coupling between a high function device of the switching fabric 10 (FIG. 1) and an adjacent device of the switching fabric (e.g., the data ring segment 18 providing coupling between the dedicated management device 42 and the switching device 12 designated SWITCH_0) of FIG. 1; a first high function memory unit link bandwidth field 606 for carrying a four-bit value indicative of a current amount of bandwidth available at a corresponding memory unit link providing coupling between a high function device of the switching fabric 10 (FIG. 1) and a corresponding memory unit (e.g., the memory unit link 55 providing coupling between the dedicated management device 42 and the first high function memory unit 54 designated MEMORY_A of FIG. 1); and a second high function memory unit link bandwidth field 608 for carrying a four-bit value indicative of a current amount of bandwidth available at a corresponding memory unit link providing coupling between a high function device of the switching fabric and a corresponding memory unit (e.g., the data ring segment 57 providing coupling between the dedicated management device 42 and the second high function memory unit 56 designated MEMORY_B of FIG. 1).

The patrol message 600 also includes a second cycle string 620 for carrying data ring channel bandwidth parameters indicative of amounts of bandwidth available at corresponding ones of the data ring segments 18 (FIG. 1) associated with corresponding ones of the switching devices 12 and 30 (FIG. 1) of the packet switching fabric. The second cycle string 620 of the patrol message includes: a first device link bandwidth field 622 for carrying a five-bit data ring channel bandwidth value indicative of a current amount of bandwidth available at the data ring segment 18 (FIG. 1) providing coupling between SWITCH_3 and an adjacent device of the switching fabric; a second device link bandwidth field 624 for carrying a five-bit data ring channel bandwidth value indicative of a current amount of bandwidth available at the data ring segment 18 (FIG. 1) providing coupling between SWITCH_2 and an adjacent device of the switching fabric; a third device link bandwidth field 626 for carrying a five-bit data ring channel bandwidth value indicative of a current amount of bandwidth available at the data ring segment 18 (FIG. 1) providing coupling between SWITCH_1 and an adjacent device of the switching fabric; and a fourth device link bandwidth field 628 for carrying a five-bit data ring channel bandwidth value indicative of a current amount of bandwidth available at the data ring segment 18 (FIG. 1) providing coupling between SWITCH_0 and an adjacent device of the switching fabric.

As mentioned above, in the described embodiment, the total bandwidth available in transmitting data via each of the data ring segments 18 (FIG. 1) of the data ring is 3.2 Gbps. Therefore, each of the data ring segments may support up to thirty-two 100 Mbps channels, and each of the data ring channel bandwidth values includes five bits having a value between 0 and 32. As mentioned above, the control ring message processing unit 170 (FIG. 3A) is operative to read and adjust each of the data ring channel bandwidth values carried by the patrol message in accordance with a channel rate reservation process. The control ring message processing unit is operative to: increase selected ones of the data ring channel bandwidth values by one upon allocating 100 Mbps of bandwidth for a corresponding channel; and decrease selected ones of the data ring channel bandwidth values by one upon releasing 100 Mbps of bandwidth from a corresponding channel.

The patrol message 600 further includes a third cycle string 630 for carrying values indicative of amounts of bandwidth available at corresponding ones of the memory unit lines 103 and 105 (FIG. 2A) of corresponding ones of the switching devices 12 and 30 (FIG. 1) of the packet switching fabric. The third cycle string 630 of the patrol message includes: a first memory unit link bandwidth field 632 for carrying a four-bit value indicative of a current amount of bandwidth available at the memory unit link 103 (FIG. 2A) providing coupling between the source managing unit 90 (FIG. 2A) and the first memory unit 102 (FIG. 2A) of SWITCH_3 of the switching fabric 10 (FIG. 1); a second memory link bandwidth field 634 for carrying a four-bit memory unit bandwidth value indicative of a current amount of bandwidth available at the memory unit link 105 (FIG. 2A) providing coupling between the source managing unit 90 (FIG. 2A) and the second memory unit 104 (FIG. 2A) of SWITCH_3 of the switching fabric; a third memory unit link bandwidth field 636 for carrying a four-bit memory unit bandwidth value indicative of a current amount of bandwidth available at the memory unit link 103 (FIG. 2A) providing coupling between the source managing unit and the first memory unit 102 (FIG. 2A) of SWITCH_2 of the switching fabric; a fourth field 638 for carrying a bandwidth value indicative of a current amount of bandwidth available at the memory unit link 105 (FIG. 2A) of SWITCH_2; a fifth memory link bandwidth field 640 for carrying a four-bit value indicative of a current amount of bandwidth available at the memory unit link 103 (FIG. 2A) of SWITCH_1; a sixth field 642 for carrying a four-bit value indicative of a current amount of bandwidth available at the memory unit link 105 (FIG. 2A) of SWITCH_1; a seventh field 644 for carrying a value indicative of a current amount of bandwidth available at the memory unit link 103 (FIG. 2A) of SWITCH_0; and an eighth field 646 for carrying a value indicative of a current amount of bandwidth available at the memory unit link 105 (FIG. 2A) of SWITCH_0.

FIG. 7 shows a block diagram depicting a field structure of a packet transfer initialization message (PTI message) at 650, the PTI message 650 being transmitted via the data ring 19 (FIG. 1) of the packet switching fabric 10 (FIG. 1). The PTI message 650 is used in multicast packet transfer operations for instructing specified destination switching devices to transmit an associated data packet from specified ones of the network output ports of the corresponding specified destination device. The PTI message 650 is transmitted via the 33-bit data ring 19 (FIG. 1) of the switching fabric, and includes two cycle strings, each having 33 bits and being transmitted during a corresponding cycle of the data ring. The PTI message 650 includes a first cycle string 652 for carrying multicast instructions for multicasting an associated data packet from specified destination network ports of a specified destination one of the switching devices 12 and 30 (FIG. 1). The first cycle string 652 includes: a PTI message ID field 654 for carrying a three bit PTI message ID value of "001" for identifying the message 650 as a PTI message; a first source device ID field 656 for carrying two higher order bits of a source device ID value indicating a corresponding source one of the switching devices storing the associated data packet that is to be multicasted; a second source device ID field 658 for carrying a lowest order bit of the source device ID value; a packet destination ID field 660 for carrying a 7-bit packet destination ID value for indicating destination network output ports for multicasting the associated data packet; and an operation type field 662. The PTI message 650 also includes a second cycle string 670 for carrying multicast instructions for multicasting an associated data packet via a gateway (not shown) coupled with the packet switching fabric 10 (FIG. 1).

Figure 8:
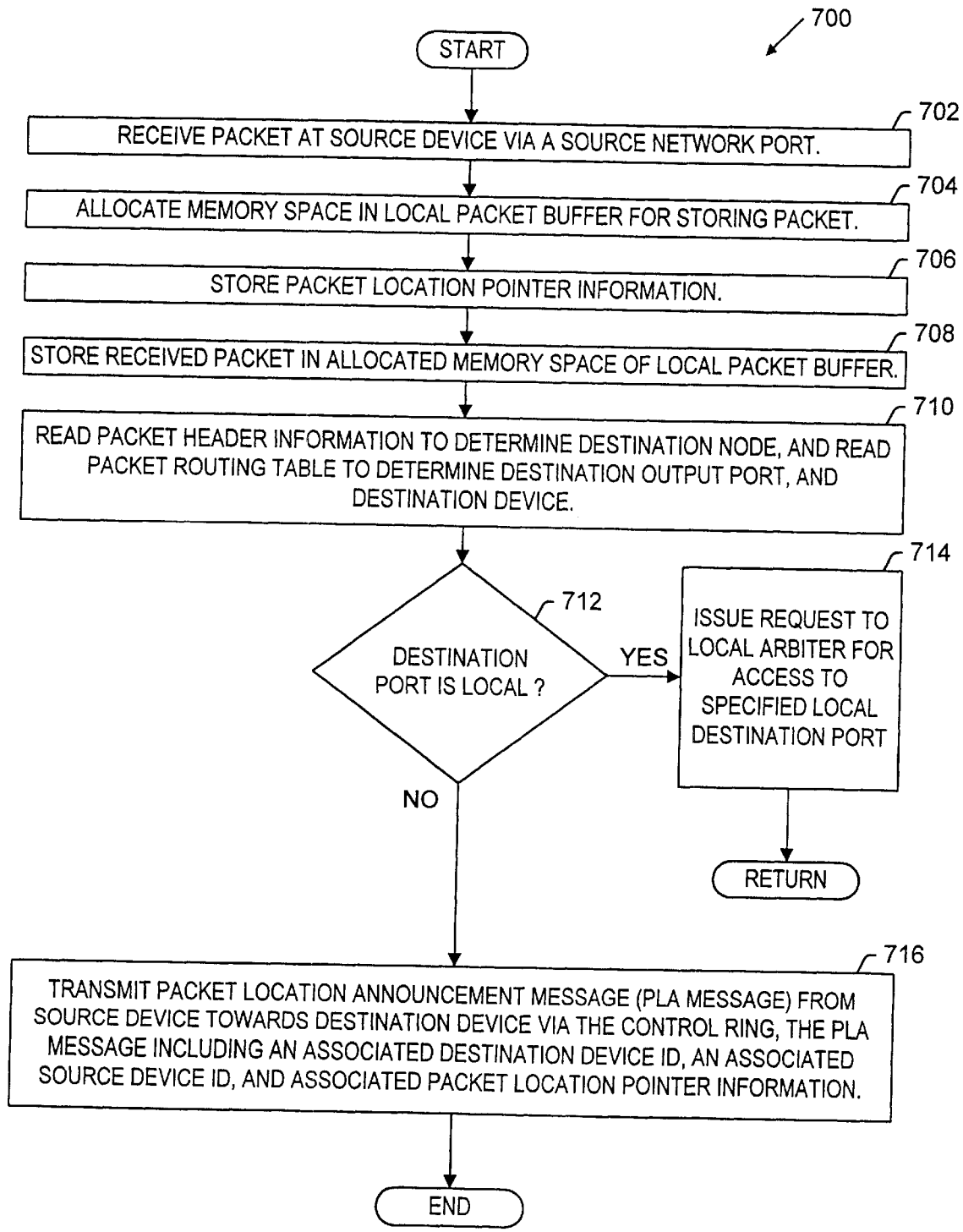
FIG. 8 is a flow diagram illustrating a source device managing process performed by the source managing unit of a source one of the switching devices in response to receiving a data packet via a network port of the source switching device.

FIG. 8 shows a flow diagram illustrating a source device managing process at 700, the process 700 being initiated by the source managing unit 90 (FIG. 2A) of a corresponding source one of the switching devices 12 and 30 (FIG. 1). The process 700 begins with a step 702 in which a data packet is received at a source one of the switching devices 12 and 30 (FIG. 1) via a corresponding source one of the network input ports 88 (FIG. 3A) and 120 (FIG. 3B). From step 702, the process proceeds to step 704 in which the packet buffer control unit 340 (FIG. 3A) allocates memory space in the local packet buffer 100 (FIG. 3A) for storing the data packet received in step 702. From step 704, the process proceeds to step 706 in which packet location pointer information indicative of the memory space in the packet buffer 100 for storing the received data packet, is stored in a memory (not shown) of the packet buffer control unit 340 (FIG. 3A). In step 708, the received data packet is stored in the allocated memory space of the local packet buffer of the source device. From step 708, the process proceeds to step 710 in which the packet routing control unit 302 (FIG. 3A) reads packet header information of the received data packet in order to determine a destination node associated with the received data packet. Also in step 710, the packet routing control unit 302 (FIG. 3A) reads the packet routing table 304 (FIG. 3A) to determine a destination one of the network output ports 84 (FIG. 3A) and 112 (FIG. 3B) of a destination one of the switching devices 12 and 30 (FIG. 1).

From step 710, the process proceeds to 712 at which it is determined whether the destination device (determined in step 710 by the packet routing and control unit) is local, that is whether the destination device is the same switching device at which the packet has been received. If it is determined at 712 that the destination port is local, the process proceeds to step 714 in which the packet routing control unit 302 (FIG. 3A) issues a request to the output arbitration unit 274 (FIG. 3A) of the output queuing control unit 270 (FIG. 3A) for access to the destination network port associated with the received data packet, as determined in step 710, after which the process returns.

Alternatively, if it is determined at 712 that the destination port is not a local network port, the process proceeds to step 716 in which the control ring transmitting unit 186 (FIG. 3A) transmits a PLA message 400 (FIG. 4A) from the source device towards the destination device via the control ring 25 (FIG. 1) of the packet switching fabric. As described above, the PLA message includes: an associated destination device ID which is provided by the packet routing control unit 302 (FIG. 3A) to the input 194 (FIG. 3A) of the control ring transmitting unit 186 (FIG. 3B); an associated source device ID value also provided by the packet routing control unit; and associated packet location pointer information which is provided by the packet buffer control unit 340 (FIG. 3A) to port 196 (FIG. 3A) of the control ring transmitting unit 186 (FIG. 3A).

Figure 9A:
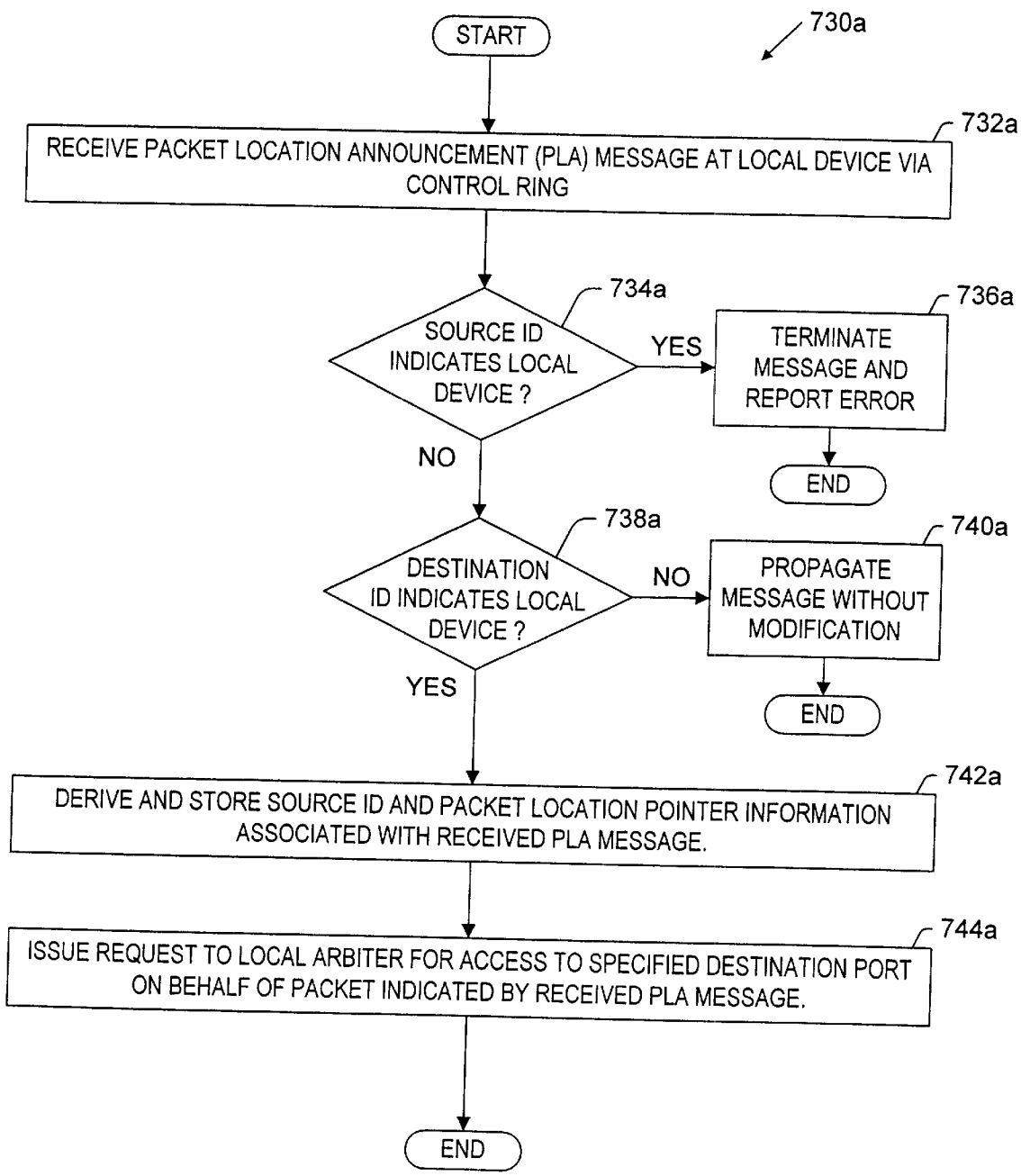
FIG. 9A is a flow diagram illustrating a destination device managing process performed by the destination managing unit of a destination one of the switching devices in response to receiving a unicast packet location announcement (PLA) message.

FIG. 9A shows a flow diagram illustrating a destination device managing process at 730*a*, the process 730*a* being performed by the destination managing unit 74 (FIG. 2A) and the control ring processing circuit 60 (FIG. 2A) of a destination one of the switching devices 12 and 30 (FIG. 1) in response to receiving a unicast PLA message 400 (FIG. 4A) from a source one of the switching devices via the control ring 24 (FIG. 1) of the packet switching fabric. The process 730*a* begins with step 732*a* in which the PLA message is received at the control ring receiving unit 162 (FIG. 3A) of the destination device. From step 732*a*, the process proceeds to 734*a* at which it is determined the source device ID value carried by the source ID field 410 (FIG. 4A) of the PLA message matches a device ID value associated with the destination device, and if so, the process proceeds to step 736*a* in which the control ring message processing unit 170 (FIG. 3A) terminates the message and reports an error, after which the process ends.

Alternatively, if is determined at 734*a* that the source device ID value carried by the packet location announcement message does not match the local device ID value, the process proceeds to 738*a* at which it is determined whether the destination device ID value, carried by the destination device ID fields 404 and 408 (FIG. 4A) of the PLA message, matches the local device ID value, and if not, the process proceeds to step 740*a* in which the control ring message processing unit 170 (FIG. 3A) passes the PLA message to the control ring via the control ring transmitting unit 186 (FIG. 3A) without modification. Alternatively, if it is determined at 738 that the destination ID value carried by PLA message matches the local device ID value, the process proceeds to step 742*a* in which the control ring message processing unit 170 (FIG. 3A) derives the source ID value carried by the source ID field 410 (FIG. 4A) of the PLA message, and the packet location pointer information carried by fields 416 and 420 (FIG. 4A) of the PLA message. From step 742*a*, the process proceeds to step 744*a* in which the control ring message processing unit 170 (FIG. 3A) issues a request to the output arbitration unit 274 (FIG. 3A) for access to a destination network output port connected to a corresponding destination one of the transmit buffer queues 80 (FIG. 3A) indicated by the destination ID value carried by the received PLA message. The output queuing control unit 270 (FIG. 3A) stores the packet location information, carried by fields 416 and 420 (FIG. 4A) of the PLA message, as well as the source device ID value carried by field 410 (FIG. 4A) and the destination ID value carried by fields 404 and 408 (FIG. 4A) in the packet location information unit 272 (FIG. 3A).

FIG. 9B shows a flow diagram illustrating a destination device managing process at 730*b*, the process 730*b* being performed by the destination managing unit 74 (FIG. 2A) and the control ring processing circuit 60 (FIG. 2A) of a destination one of the switching devices 12 and 30 (FIG. 1) in response to receiving a multicast PLA message 430 (FIG. 4B) from a source one of the switching devices via the control ring 24 (FIG. 1) of the packet switching fabric. The process 730*b* begins with step 732*b* in which the multicast PLA message is received at the control ring receiving unit 162 (FIG. 3A) of the destination device. From step 732*b*, the process proceeds to 734*b* at which it is determined the source device ID value carried by the source ID field 448 (FIG. 4B) of the multicast PLA message matches a device ID value associated with the destination device, and if so, the process proceeds to step 736*b* in which the control ring message processing unit 170 (FIG. 3A) terminates the message and reports an error, after which the process ends.

Alternatively, if is determined at 734*b* that the source device ID value carried by the packet location announcement message does not match the local device ID value, the process proceeds to 738*b* at which it is determined whether the destination bit map carried by the destination device ID fields 436, 438, 440, and 442 (FIG. 4B) of the multicast PLA message, indicates the local device, and if not, the process proceeds to step 740*b* in which the control ring message processing unit 170 (FIG. 3A) passes the multicast PLA message to the control ring via the control ring transmitting unit 186 (FIG. 3A) without modification. Alternatively, if it is determined at 738*b* that the destination bit map of the multicast PLA message indicates the local device, the process proceeds to step 741*b* in which the control ring message processing unit 170 (FIG. 3A) clears the corresponding one of the destination device ID fields 436, 438, 440, and 442 (FIG. 4B) of the destination bit map carried by the multicast PLA message that identifies the destination device.

From step 741*b*, the process proceeds to step 742*b* in which the control ring message processing unit derives the source ID value carried by the source ID field 448 (FIG. 4B) of the multicast PLA message, and the packet location pointer information carried by fields 460 and 466 (FIG. 4B) of the PLA message. From step 742*b*, the process proceeds to step 744*b* in which the control ring message processing unit 170 (FIG. 3A) issues a request to the output arbitration unit 274 (FIG. 3A) for access to a destination network output port connected to a corresponding destination one of the transmit buffer queues 80 (FIG. 3A) indicated by the destination ID value carried by the received PLA message. The output queuing control unit 270 (FIG. 3A) stores the packet location information, carried by fields 460 and 466 (FIG. 4B) of the PLA message, as well as the source device ID value carried by field 448 (FIG. 4B) in the packet location information unit 272 (FIG. 3A).

From step 744b, the process proceeds to 745b at which the control ring message processing unit determines whether all bits in the destination device ID fields 436, 438, 440, and 442 (FIG. 4B) of the destination bit map have been cleared, and if so, the process proceeds to step 746b in which the control ring message processing unit terminates the message. Alternatively, if is determined at 745b that not all of the bits of the destination bit map have been cleared, the process proceeds to step 748b in which the control ring message processing unit propagates the message.

Figure 10A:
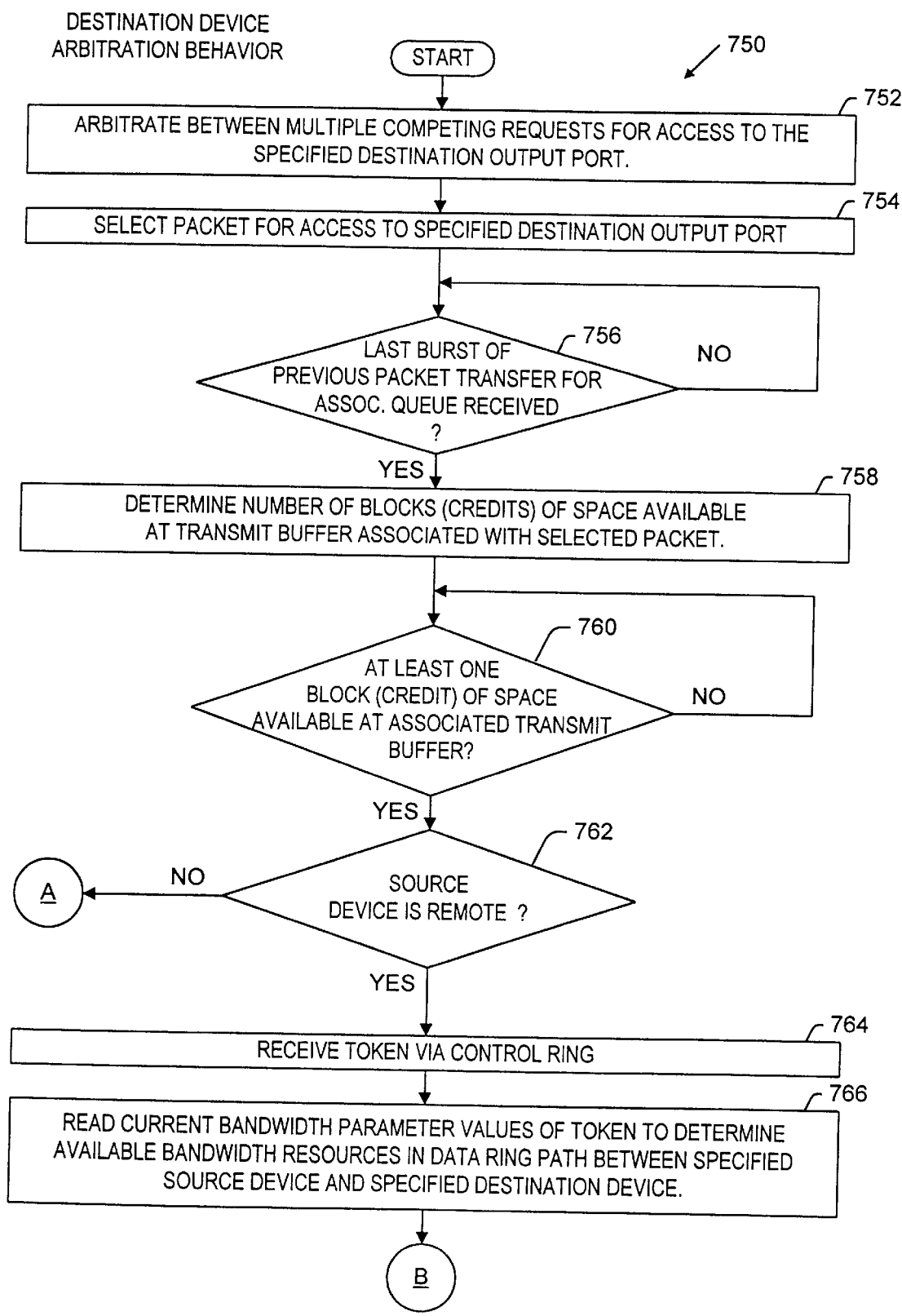
FIGS. 10A through 10C are flow diagrams illustrating a destination device arbitration process performed by the destination managing unit of a destination one of the switching devices in accordance with the output queuing controlled packet transfer protocol of the present invention.

FIG. 10A shows a flow diagram illustrating a destination device arbitration process at 750, the arbitration process 750 being performed by the destination managing unit 74 (FIG. 2A) and the control ring processing circuit 60 (FIG. 2A) of a destination one of the switching devices 12 and 30 (FIG. 1). The process 750 begins with step 752 in which the output arbitration unit 274 (FIG. 3A) arbitrates between multiple local and remote competing requests for access to a corresponding destination one of the transmit buffer queues 80 (FIG. 3A) and 110 (FIG. 3B). As mentioned above, the competing requests are made on behalf of received data packets which may have been received at a local network port of the destination switching device, or a remote network port of a remote one of the switching devices 12 and 30 (FIG. 1). As described above, local requests on behalf of data packets stored in the local packet buffer 10 (FIG. 3A) of the local device are provided to the output arbitration unit 274 (FIG. 3A) by the source management unit 90 (FIG. 3A). Also as mentioned above, remote requests for access to a destination port on behalf of packets received at remote ones of the switching devices are provided to the output arbitration unit 274 (FIG. 3A) by the control ring message processing unit 170 (FIG. 3A) in response to receiving a PLA message 400 (FIG. 4A) from the device that received the packet.

From step 752, the process proceeds to step 754 in which the arbitration unit 274 (FIG. 3A) selects one of the data packets, represented by a corresponding request, for access to an associated destination one of the transmit buffer queues 80 (FIG. 3A) or 110 (FIG. 3B). The output queuing control unit 270 (FIG. 3A) then accesses the corresponding packet location information, and destination ID value associated with the selected data packet, from the packet location information unit 272 (FIG. 3A).

From step 754, the process proceeds to 756 at which it is determined whether a last burst of a previous data packet has been received by the associated one of the transmit buffer queues 80 (FIG. 3A) and 110 (FIG. 3B) in accordance with a previous packet transfer operation. The determination at 756 is made by the data distribution control unit 240 (FIG. 3A) which is operative to monitor the transmit buffer queues as described above. If it is determined at 756 that the last burst of the previous data packet has not been received, the process waits until it is determined at 756 that the last burst of the previous data packet has been received.

After it is determined at 756 that the last burst of the previous data packet has been received at the associated one of the transmit buffer queues, the process proceeds to step 758 in which the output buffer manager 244 (FIG. 3A) of the destination switching device determines a number of blocks, or credits, of available space at the associated destination of the transmit buffer queues 80 (FIG. 3A) indicated by the selected packet. As mentioned above, the output buffer manager 244 (FIG. 3A) includes logic for counting the number of bursts of data transmitted to each of the transmit buffer queues.

From step 758, the process proceeds to 760 at which the output buffer manager 244 (FIG. 3A) of the data distribution control unit determines whether at least one block, or credit, of space is available at the associated destination one of the transmit buffer queues indicated by the selected packet, and if not, the determination at 760 is repeated until at least one block of space is available at the transmit buffer queue. After it is determined at step 760 that at least one block of space is available at the associated transmit buffer queue, the process proceeds to 762 at which the output queuing control unit 270 (FIG. 3A) reads the source device ID value associated with the selected data packet from the packet location information unit 272 (FIG. 3A) to determine whether the source device associated with the selected packet is remote from the destination device. If it is determined at 762 that the source device associated with the selected data packet is not remote, the process proceeds to "A" (to FIG. 10C) as further explained below.

Alternatively, if it is determined at 762 that the source device is remote, the process proceeds to step 764 in which the control ring message processing unit 170 (FIG. 3A) receives the patrol message 600 (FIG. 6). In step 766, the control ring message processing unit 170 (FIG. 3B) reads the current bandwidth parameter values of the patrol message 600 (FIG. 6) to determine the current amount of bandwidth resources in corresponding ones of the data ring segments 18 (FIG. 1) disposed in a path between the source device and destination device associated with the selected data packet, and also reads the current bandwidth parameter values associated with the memory unit 102, 104 (FIG. 2A) at which the selected data packet is stored. In step 766, the control ring message processing unit 170 (FIG. 3A) reads the bandwidth parameter fields of the second and third cycle strings 620 and 630 (FIG. 6) of the patrol message. From step 766, the process proceeds to "B" (to FIG. 10B).

Figure 10B:
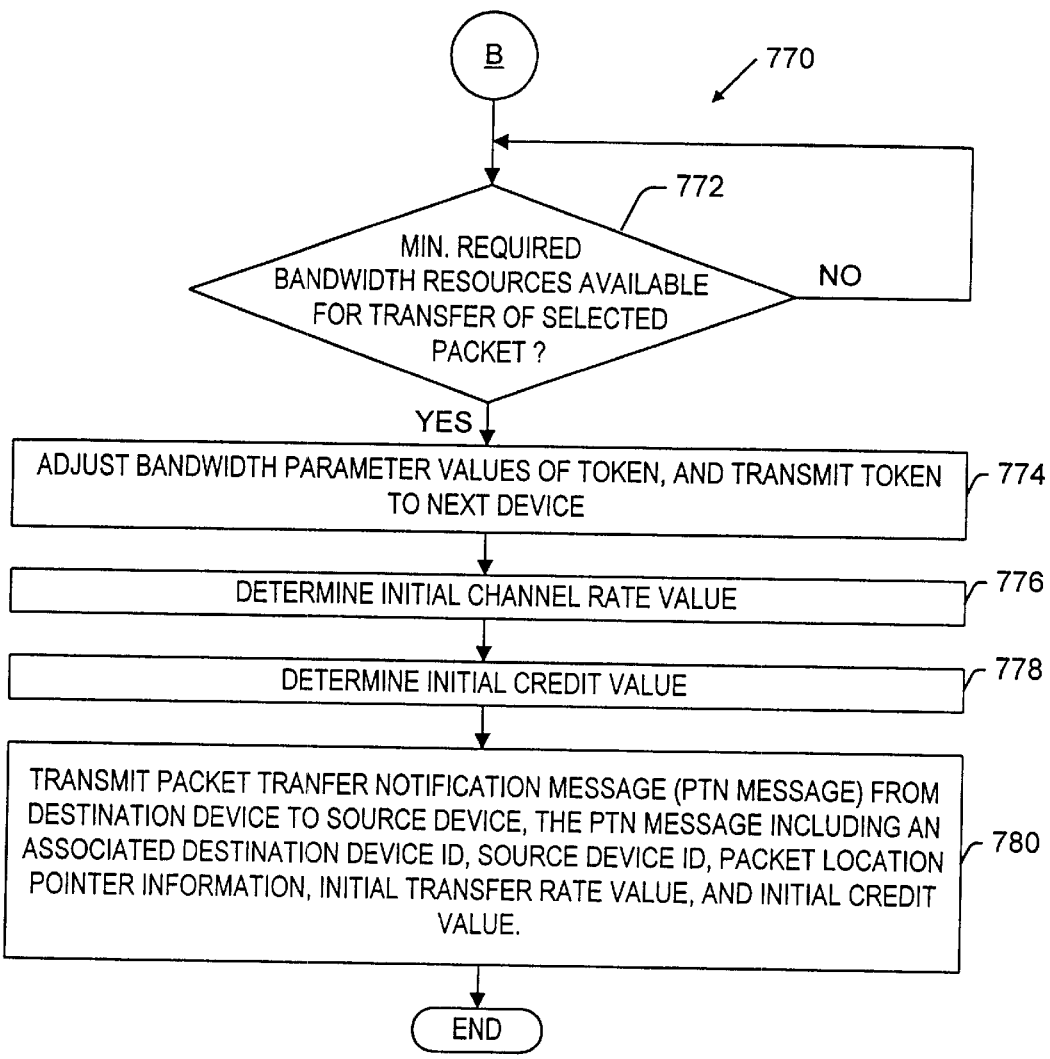

FIG. 10B shows a flow diagram illustrating further steps of the destination arbitration process 750 (FIG. 10A). The depicted process proceeds from "B" (from FIG. 10A) to 772 at which the control ring message processing unit 170 (FIG. 3A) determines whether a minimum amount of required bandwidth resources is available for transfer of the selected data packet from the source device is the destination device via a corresponding source destination channel path. The required amount of bandwidth resources for transfer of the selected packet from the corresponding packet buffer 100 (FIG. 3A) of the corresponding source one of the switching devices to the destination one of the transmit buffer queues 80 (FIG. 3A) of 110 (FIG. 3B) is determined based on the type of network output port, and the network link 15 and 30 (FIG. 1) to which the destination network output port is connected. For example, if the destination network port associated with the selected data packet is connected to a 100 Mbps link, the control ring message processing unit 170 (FIG. 3A) reads the device link bandwidth fields 622, 624, 626, 628 (FIG. 6) of the patrol message to determine if each of the data ring segments 18 (FIG. 1), disposed between the corresponding source and destination devices, currently has at least 100 Mbps of bandwidth available, and also reads the memory unit link bandwidth fields 632–646 (FIG. 6) to determine of the memory unit link 103, 105 (FIG. 2A) associated with the corresponding source device currently has at least 100 Mbps of bandwidth available.

If it is determined at 772 that a minimum required amount of resources are not available for transfer of the selected packet, the process waits until the patrol message 600 (FIG. 6) propagates around the data ring of the switching fabric 10 (FIG. 1) back to the destination device associated with the selected packet, and repeats the determination at 772 until the minimum amount of bandwidth resources becomes available after which the process proceeds to step 774.

In step 774, the control ring message processing unit 170 (FIG. 3A) adjusts corresponding ones of the bandwidth parameter values of the patrol message 600 (FIG. 6), and transmits the patrol message to the next device via the data ring. As mentioned above, the control ring message processing unit 170 (FIG. 3A) is operative to read and adjust each of the data ring channel bandwidth values carried by the patrol message in accordance with a channel rate reservation process. The control ring message processing unit is operative to: increase selected ones of the data ring channel bandwidth values by one upon allocating 100 Mbps of bandwidth for a corresponding channel; and decrease selected ones of the data ring channel bandwidth values by one upon releasing 100 Mbps of bandwidth from a corresponding channel. In accordance with the channel rate reservation process, if the capacity of the destination network port is greater than 100 Mbps, and the maximum allowable channel rate is not reached, the control ring message processing unit 170 (FIG. 3A) attempts to reserve additional channel bandwidth for the associated source-destination channel path each time the patrol message is received by the destination device before the current packet transfer operation is complete. After a last burst of packet data is received via the associated source-destination channel path, the bandwidth parameter values of the patrol message 600 (FIG. 6), that associated with the source-destination channel path, are adjusted to return the previously allocated bandwidth.

From step 774, the process proceeds to step 776 in which the output queuing control unit 270 (FIG. 3A) determines an initial channel rate value for a corresponding source-destination channel for transferring the selected data packet from the packet buffer 100 (FIG. 3A) of the source device to the destination network output port of the destination device. The initial channel rate value is determined by reading the patrol message 600 (FIG. 6) and also by considering the bandwidth capacity of the network output port. Note that the channel transfer rate may be increased in steps of 100 Mbps. If the destination network port is a 1 Gbps output port, and if less than 1 Gbps of bandwidth is available, then a channel will be set up for 100 Mbps and the channel will be subsequently increased by the incremental rate transfer message (IRT message) 520 (FIG. 4E).

In step 778, the output buffer manager 244 (FIG. 3A) of the destination device determines an initial credit value based on the number of blocks of available memory space in the corresponding destination one of the transmit buffer queues 80 (FIG. 3A) or 110 (FIG. 3B) as described above with reference to field 494 (FIG. 4C) of the PTN message.

In step 780, the control ring message processing unit 170 develops a packet transfer notification message (PTN message) in response to packet transfer information including: the destination device ID value associated with the selected packet received from port 276 of the output queuing control unit 270 (FIG. 3A); the source device ID value associated with the selected data packet received from the output queuing control unit 270 (FIG. 3A); packet location pointer information associated with the selected data packet and received at the control ring message processing unit 170 (FIG. 3A) from the packet location information unit 272 of the output queuing control unit; the initial transfer rate value associated with the selected data packet received from the output buffer manager 244 (FIG. 3A); and the initial credit value received from port 254 of the data distribution control unit 240 (FIG. 3A). The PTN message 470 (FIG. 4C) is transmitted by the control ring interface and processing unit 60 (FIG. 3A) of the destination device to the source device associated with the selected data packet via the control ring of the packet switching fabric 10 (FIG. 1).

Figure 10C:
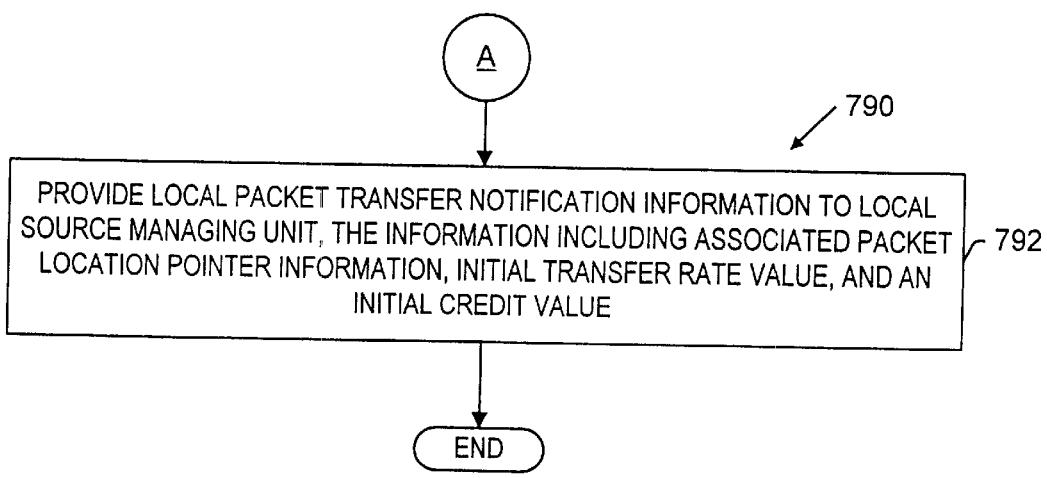

FIG. 10C shows a flow diagram illustrating further steps of the destination device arbitration process 750 (FIG. 10A). The depicted process proceeds from "A" (from FIG. 10A) to step 792 in which the local output queuing control unit 270 (FIG. 3A) provides packet transfer notification information to the source managing unit 90 (FIG. 3A) of the local switching device, the information including the associated packet location pointer information, initial transfer rate value, and the initial credit value for a local packet transfer operation for transferring the selected packet from the packet buffer 100 (FIG. 3A) to the data distribution control unit 240 (FIG. 3A) via the FIFO 330 (FIG. 3A) to the destination network port via the corresponding transmit buffer queue.

Figure 11A:
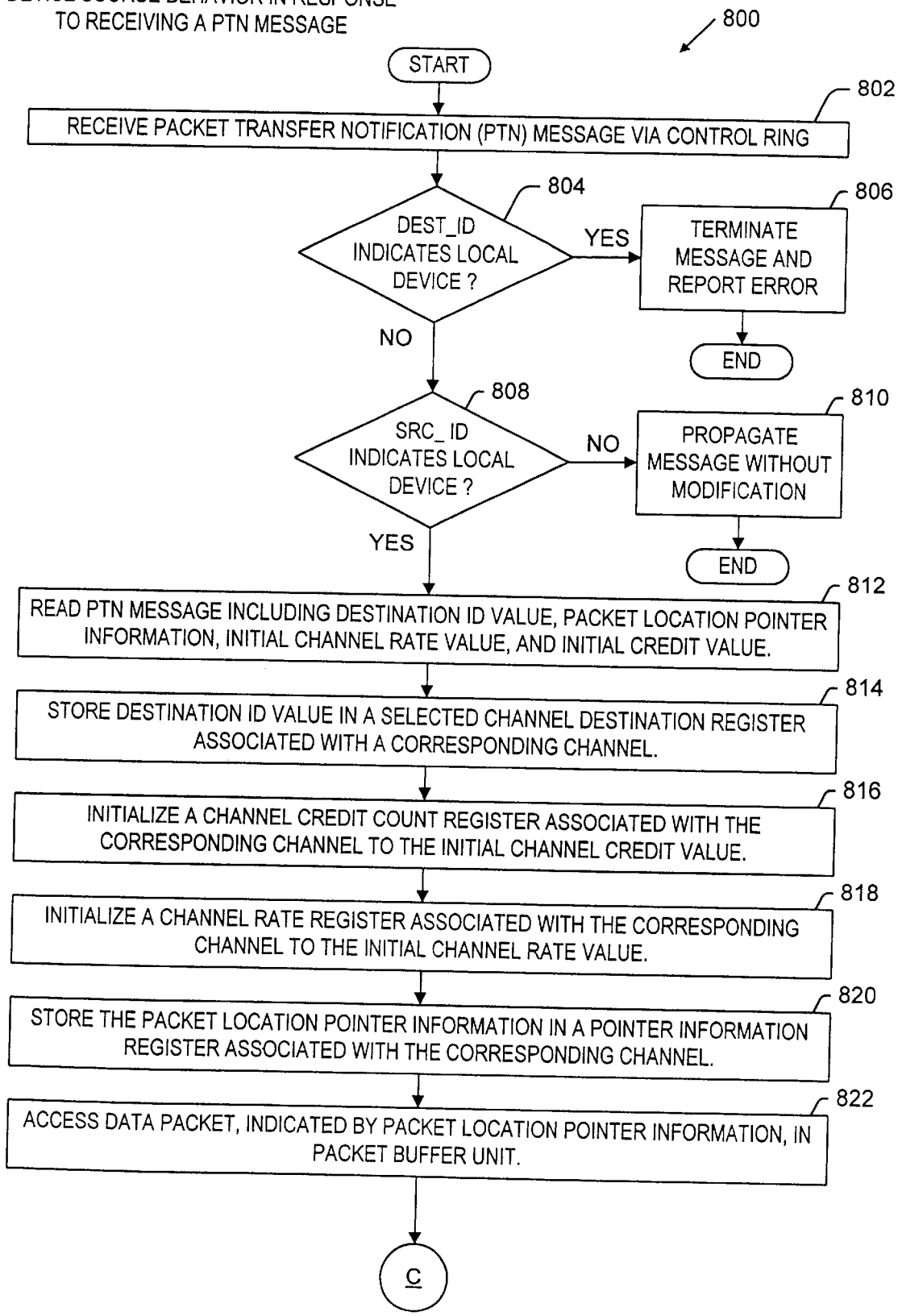
FIGS. 11A and 11B are flow diagrams illustrating a packet transfer process performed by the source managing unit of a source switching device in response to receiving a packet transfer notification (PTN) message from a corresponding destination switching device.

FIG. 11A shows a flow diagram illustrating a source device source process initiated in response to receiving a PTN message 470 (FIG. 4C). The process 800 begins with step 802 in which the control ring message processing unit 170 (FIG. 3A) of a source one of the switching devices 12 and 30 (FIG. 1) receives a PTN message via the control ring 25 (FIG. 1). From step 802, the process proceeds to 804 at which the control ring message processing unit 170 (FIG. 3A) determines whether the destination device ID value, carried by fields 474 and 478 (FIG. 4C) of the PTN message, matches the local device ID value, and if so, the process proceeds to step 806 in which the PTN message is terminated by the control ring message processing unit, and an error is reported, after which the process ends.

Alternatively, if it is determined at 804 that the destination ID value carried by the PTN message matches the local device ID value, the process proceeds to 808 at which the control ring message processing unit 170 (FIG. 3A) determines whether the source ID value, carried by field 480 (FIG. 4C) of the PTN message 470, matches the local device ID value, and if not, the process proceeds to step 810 in which the PTN message is propagated to the next downstream one of the devices via the control ring 25 (FIG. 1) without modification, after which the process ends. Alternatively, if it is determined at 808 that the source ID value carried by the PTN message matches the local device ID value, the process proceeds to step 812 in which the control ring message processing unit 170 (FIG. 3A) reads the fields of the PTN message 470 (FIG. 4C)

In step 814, the source channel control unit 318 (FIG. 3A) of the source device receives the destination ID value carried by fields 474 and 478 (FIG. 4C) of the PTN message from the control ring message processing unit 170 (FIG. 3A), and stores the destination ID value in a selected one of the channel destination ID registers 370 (FIG. 3C) associated with a corresponding channel for transferring the selected packet from the source device to the corresponding destination device.

In step 816, the source channel control unit 318 (FIG. 3A) initializes a corresponding one of the channel credit count registers 372 (FIG. 3C) associated with the corresponding channel to the initial credit value received via fields 494 (FIG. 4C) of the received PTN message. In step 818, the source channel control unit 318 (FIG. 3A) initializes a corresponding one of the channel rate registers 375 (FIG. 3C) to the initial channel rate value received via field 496 (FIG. 4C) of the PTN message. In step 820, the source channel control unit 318 (FIG. 3A) stores the packet location pointer information received via fields 488 and 492 (FIG. 4C) of the PTN message in the corresponding one of the pointer information registers 374 (FIG. 3C) associated with the corresponding channel. In step 822, the source channel control unit 318 (FIG. 3A) provides the channel data transfer signals at its port 324 to port 342 of the packet buffer control unit 340 (FIG. 3A) causing the packet buffer control unit to access the selected data packet stored in the packet buffer 100 (FIG. 3A) which is indicated by the packet location pointer information received via the corresponding PTN message. From step 822, the process proceeds to "C" (to FIG. 11B).

Figure 11B:
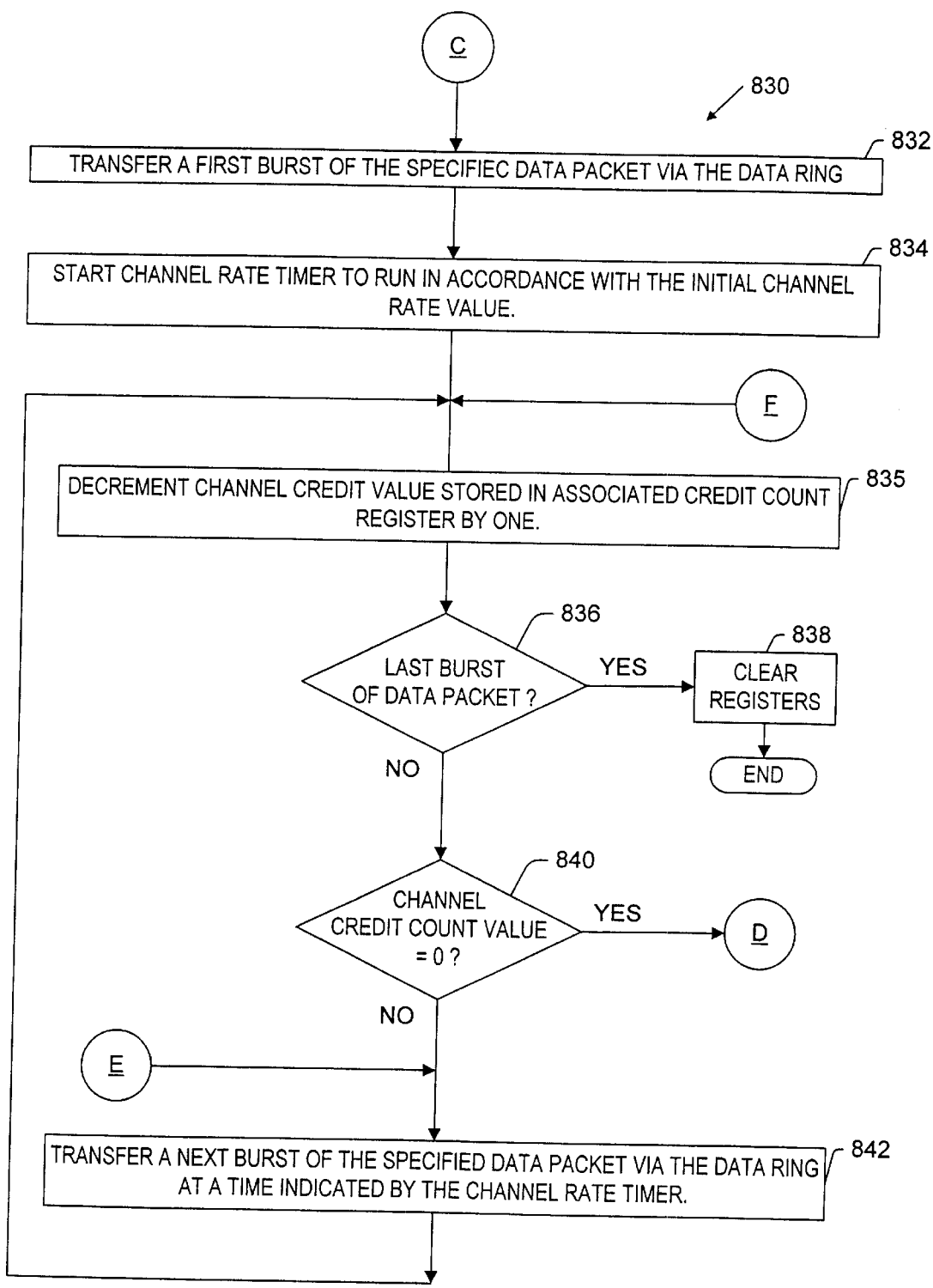

FIG. 11B shows a flow diagram illustrating further steps at 830 of the source device process 800 (FIG. 11A). The depicted process proceeds from "C" (from FIG. 11A) to step 832 in which the data ring transmitting unit 216 (FIG. 3A) transfers a first burst of the selected data packet via the data ring. In step 832, the data ring transmitting unit receives the data packet from the packet buffer 100 (FIG. 3A) via the FIFO 330 at its input port 224. Note that in step 832, the packet routing and control unit 302 (FIG. 3A) which is coupled to the FIFO 330 via node 335 is operative to append the bursts of the selected data packet with a destination ID value so that the bursts of data packet can be received at the associated destination device.

In step 834, the channel rate timer 368 (FIG. 3C) of the source channel control unit 318 (FIG. 3A) is initialized to run in accordance with the initial channel rate value received via the PTN message and stored in the corresponding one of the channel rate registers 370 (FIG. 3C) as indicated in step 818 (FIG. 11A). As described above, the initial channel rate value indicated a period which the source managing unit 90 (FIG. 3A) waits between transmitting bursts of the selected data packet in accordance with the available bandwidth resources associated with the corresponding source destination channel path for transmitting the selected data packets as determined by the destination device in step 776 (FIG. 10B) of the destination device process. From step 834, the process proceeds to step 835 in which the source channel control unit 318 (FIG. 3A) decrements the channel credit value stored in the associated credit count register 372 (FIG. 3A) by one in response to the burst of the selected data packet being transferred.

From step 835, the process proceeds to 836 at which the source channel control unit 318 (FIG. 3A) determines whether the last burst of the selected data packet has been transmitted, and if so, the process proceeds to step 838 in which each of the set of registers of the associated channel parameter memory unit 366 (FIG. 3C), associated with the selected data packet is cleared, after which the process ends. Alternatively, if it is determined at 836 that the last burst of the selected data packet has not been transferred, the process proceeds to 840 at which the source channel control unit 318 (FIG. 3A) reads the contents of the credit count register 372 (FIG. 3C) associated with the corresponding channel to determine if the contents of the channel credit count is equal to zero, and if so, the process proceeds to "D" (to FIG. 12) in which the source device waits for a corresponding ICT message 500 (FIG. 4D).

Alternatively, if it is determined at 840 that the channel credit count value is not equal to zero, the process proceeds to step 842 in which the source channel control unit 318 (FIG. 3A) instructs the packet buffer control unit 340 (FIG. 3A) to transfer the next burst of the selected data packet from the packet buffer 100 to the data ring processing unit 66 (FIG. 3A) at a time indicated by the corresponding one of the channel rate timers 368 (FIG. 3C), after which the process 830 ends.

FIG. 12 shows a flow diagram illustrating a source device behavior process at 850 which is initiated in response to receiving an ICT message 500 (FIG. 4D). The depicted process proceeds from "D" (from FIG. 11B) and proceeds to step 852 in which the control ring message processing unit 170 (FIG. 3A) of the source device receives an ICT message 500 (FIG. 4D) via the control ring. From step 852, the process proceeds to 854 at which the control ring message processing unit 170 (FIG. 3A) determines whether the destination ID value, carried by fields 504 and 510 (FIG. 4D) of the ICT message, matches the local device ID value, and if so, the process proceeds to step 856 in which the ICT message is terminated, and an error is reported, after which the process ends. Alternatively, if it is determined at 854 that the ICT message is not destined for the local device, the process proceeds to 858 at which the control ring message processing unit 170 (FIG. 3A) determines whether the destination ID value, carried by fields 504 and 510 (FIG. 4D) of the ICT message, matches the value stored in any of the local channel destination ID registers 370 (FIG. 3C) of the source channel control unit of the source device, and if not, the process proceeds to step 860 in which the ICT message is propagated without modification via the control ring. Alternatively if it is determined at 858 that the received ICT message is associated with a channel previously established at the local source device, that is the destination ID value carried by the ICT message matches a destination ID value stored in one of the destination ID registers 370 (FIG. 3C) of the source device, then the process proceeds to step 862 in which the control ring message processing unit 170 (FIG. 3A) reads the values carried by the ICT message 500 (FIG. 4D) including the destination ID value and incremental credit value. From step 864, the process proceeds to step 864 in which the source channel control unit 318 (FIG. 3A) increases the associated one of the channel credit value stored in the associated one of the channel credit count registers 372 (FIG. 3C) by the incremental credit value carried by field 508 (FIG. 4D) of the received ICT message. From step 864, the process proceeds to "E" (back to FIG. 11B).

FIG. 13 shows a flow diagram illustrating a device source process at 870 that initiated in response to receiving an IRT message 520 (FIG. 4E). The process begins with step 872 in which the control ring message processing unit 170 (FIG. 3A) receives an IRT message via the control ring. From step 872, the process proceeds to 874 which the control ring message processing unit compares the destination ID value carried by fields 524 and 530 (FIG. 4E) of the IRT message to the local device ID value, and if there is a match, the process proceeds to step 876 in which the control ring message processing unit terminates the IRT message, and reports an error after which the process ends.

Alternatively, if it is determined at 874 that the destination ID value carried by the IRT message does not match the local device ID value, the process proceeds to 878 at which the control ring message processing unit 170 (FIG. 3A) determines whether the received destination device ID matches a value stored in any of the local channel destination ID registers 370 (FIG. 3C) of the source device, and if not, the process proceeds to step 880 in which the IRT message is propagated via the control ring without modification.

Alternatively, if it is determined at 878 that the destination ID value carried by the received IRT message matches a value stored in one of the destination ID registers 370 (FIG. 3C) of the source device, the process proceeds to step 882 in which the source channel control unit 318 (FIG. 3A) reads the IRT message including the destination ID value and incremental rate value carried in field 528 (FIG. 4E) of the IRT message. From step 882, the process proceeds to step 884 in which the source channel control unit 318 increases the channel rate value stored in the corresponding one of the channel rate registers 375 (FIG. 3C) associated with the corresponding one of the channel, by the incremental rate value received via the IRT message. Also in step 884, the associated one of the channel rate timers 368 (FIG. 3C) is loaded with the increased channel rate value in order to increase the corresponding channel rate. From step 884, the process proceeds back to "G" (back to FIG. 11B).

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A packet switching fabric comprising:
   means forming a data ring, means forming a control ring, and means forming a plurality of data communication network links each having at least one network node coupled thereto; and
   a plurality of output queuing controlled switching devices coupled together by said data ring means and said control ring means so that said network links can be selectively communicatively coupled, each said switching device including,
      data ring processing means for transmitting and receiving bursts of data to and from adjacent ones of said devices via said data ring means,
      network interface means having at least one network port for transmitting and receiving data packets to and from said network links,
      packet buffer means for storing the received data packets,
      source managing means communicatively coupled to said data ring processing means, and providing an interface between said network interface means and said packet buffer means, said source managing means being operative to develop pointer information for storing and reading each one of said received data packets to and from said packet buffer means, and also being operative to develop destination identification information associated with each one of said received data packets, said destination identification information indicating an associated destination one of said network ports of an associated destination one of said devices, said received data packets including transfer packets received at an associated source one of said devices that is different from said associated destination device, and local packets for which said associated destination network port is a port of said associated source device, the pointer information and destination identification information associated with each one of said local packets providing local announcement information serving as a local request for access to said associated destination network port, the pointer information and destination identification information associated with each one of said transfer packets providing transfer announcement information,
      control ring processing means responsive to said transfer announcement information, and operative to transmit and receive control messages to and from adjacent ones of said devices via said control ring means, said control messages including announcement messages each being associated with one of said transfer packets and carrying said associated transfer announcement information, said control ring processing means also being operative to provide received transfer announcement information in response to each received one of said announcement messages, said received transfer announcement information serving as a remote request for access to said associated destination network port,
      destination managing means communicatively coupled to said network interface means, and responsive to said local announcement information and said received transfer announcement information, and operative to arbitrate between competing ones of said local and remote requests for access to each of said network ports, and also operative to generate transfer notification information associated with selected ones of said transfer data packets;
   said control messages further including transfer notification messages developed by said control ring processing means in response to said transfer notification information, each said notification message being associated with one of said transfer data packets and carrying source identification information indicative of said associated source device, each said notification message indicating to said associated source device that said associated selected transfer data packet has been granted access to said associated destination network port.

2. A packet switching fabric as recited in claim 1 wherein said transfer announcement information associated with each one of said transfer data packets further includes source identification information indicating said associated source device.

3. A packet switching fabric as recited in claim 1 wherein:
   said network interface means includes a plurality of transmit buffer queues each providing for receiving data from said destination managing means, and for transmitting bursts of data to a corresponding one of said network links via a corresponding one of said network ports; and
   said destination managing means includes an output buffer manager for monitoring the availability of buffer space in each of said transmit buffer queues, and wherein each of said notification messages is transferred via said control ring means after a determination by said output buffer manager that an associated destination one of said transmit buffer queues, that is connected to said associated destination network port, includes a threshold amount of available buffer space.

4. A packet switching fabric as recited in claim 3 wherein said output buffer manager is operative to determine a number of blocks of buffer space available at each of said transmit buffer queues, each of said available blocks providing buffer space sufficient for receiving a burst of packet data from said destination managing means.

5. A packet switching fabric as recited in claim 4 wherein said notification information further comprises an initial channel credit value indicating of a number of available blocks at the destination transmit buffer queue associated with said selected transfer data packet prior to transmitting said associated notification message.

6. A packet switching fabric as recited in claim 1 wherein said packet buffer means includes at least one memory unit communicatively coupled with said source managing means via a corresponding memory unit link, and wherein each of said devices receives a channel resource patrol message from an adjacent one of said devices, said patrol message carrying channel bandwidth information indicative of bandwidth available on said data ring means and bandwidth available on said memory unit links, said control ring processing means being responsive to said channel bandwidth information and operative to read and modify said channel bandwidth information for the purpose of managing data transfer via said data ring means and via each of said memory unit links.

7. A packet switching fabric as recited in claim 1 wherein:
said data ring means includes a plurality of data ring segments each coupling a corresponding adjacent pair of said devices together;
said packet buffer means includes at least one memory unit communicatively coupled with said source managing means via a corresponding memory unit link; and
each of said devices is responsive to a channel resource patrol message received from an adjacent one of said devices, said patrol message carrying channel bandwidth information including,
a plurality of data ring segment bandwidth parameters each being indicative of an amount of bandwidth currently available at a corresponding one of said data ring segments, and
a plurality of memory unit link bandwidth parameters each being indicative of an amount of bandwidth currently available at a corresponding one of said memory unit links;
said control ring processing means being responsive to said channel bandwidth information, and being operative to read and modify said channel bandwidth information for the purpose of managing data transfer via corresponding ones of a plurality of source-destination channel paths for transmitting associated ones of said selected transfer data packets from said associated source device to said associated destination device, each of said paths including corresponding ones of said data ring segments and a corresponding one of said memory unit links.

8. A packet switching fabric as recited in claim 7 wherein said patrol message is transferred via said data ring, and wherein said control ring processing means is communicatively coupled with said data ring processing means.

9. A packet switching fabric as recited in claim 7 wherein said control ring processing means is operative to read selected sets of said data ring segment bandwidth parameters and said memory unit link bandwidth parameters of said patrol message in response to said transfer notification information, each of said selected sets of bandwidth parameters being associated with one of said source-destination channel paths, said control ring processing means being further operative to determine a maximum amount of bandwidth currently available for transmitting data via each of said source-destination channel paths based on said associated selected set of bandwidth parameters.

10. A packet switching fabric as recited in claim 9 wherein said control ring processing means is further operative to determine an initial channel rate value associated with each one of said selected transfer data packets, each said initial channel rate value indicating an initial channel rate for transmitting bursts of said associated selected transfer data packet from said packet buffer means of said associated source device to said associated destination device via said associated source-destination channel path.

11. A packet switching fabric as recited in claim 10 wherein each of said notification messages comprises:

a destination identification field for carrying said associated destination identification information;
a source identification field for carrying said associated source identification information;
a packet location pointer field for carrying said associated pointer information;
an initial channel credit field for carrying said associated initial channel credit value; and
an initial channel rate field for carrying said associated initial channel rate value.

12. A packet switching fabric as recited in claim 11 wherein:
said control ring processing means is responsive to received ones of said notification messages, and operative to provide received notification information associated with each one of said received notification messages, said received notification information including said associated source identification information, said associated destination identification information, said associated pointer information, said associated initial channel credit value, and said associated initial channel rate value; and
said source managing means is further responsive to said received notification information, and operative to transfer data bursts of said associated selected transfer data packet from said packet buffer means to said associated destination device via said associated source-destination channel path in accordance with said associated initial credit value and said associated initial channel rate value.

13. A packet switching fabric as recited in claim 12 wherein said source managing means further comprises:
a source channel control unit responsive to said received notification information, and operative to generate an initial channel data transfer signal associated with each one of said received notification messages, each of said initial channel data transfer signals being repeatedly activated a specified number of times in accordance with said associated initial channel rate value, said specified number being determined based on said associated initial channel credit value; and
a packet buffer control unit communicatively coupled to said packet buffer means and to said network ports, said packet buffer control unit being responsive to said initial channel data transfer signals, and being operative to read said specified number of data bursts of said associated selected transfer data packet from said packet buffer means in accordance with said associated initial channel rate value.

14. A packet switching fabric as recited in claim 13 wherein said source channel control unit comprises:
a channel memory means responsive to said received notification information, and being operative to manage channel information associated with corresponding ones of said source-destination channel paths, said channel information having,
said associated source identification information, said associated pointer information, a current channel credit value indicative of a number of bursts of said selected data packet to be transmitted via said corresponding source-destination channel path, said current channel credit value being initialized to said initial channel credit value, and
a current channel rate value indicative of a channel rate for transmitting bursts of said selected data packet via said corresponding source-destination channel path, said current channel rate value being initialized to said initial channel rate value; and a channel rate timer associated with said corresponding source-destination channel path, said channel rate timer being responsive to said current channel rate value, and being operative to generate a channel rate control signal that is repeatedly activated in accordance with said current channel rate value.

15. A packet switching fabric as recited in claim 13 wherein said source channel control unit includes:
   a channel memory means responsive to said received notification information, and being operative to manage channel information associated with said selected source-destination channel path, said channel information including said associated source identification information, said associated pointer information, said initial channel credit value, and said initial channel rate value; and
   a channel rate timer associated with said selected source-destination channel path, said channel rate timer being responsive to said current channel rate value, and being operative to generate said initial channel data transfer signal.

16. A packet switching fabric as recited in claim 13 wherein:
   said output buffer manager is further operative to generate incremental credit transfer information associated with said selected transfer data packet, said incremental credit transfer information indicating an incremental number of available blocks at said destination transmit buffer queue, said incremental number of available blocks having become available since said transmission of said associated notification message;
   said control messages further include incremental credit transfer messages developed by said control ring processing means in response to said incremental credit transfer information, said incremental credit transfer message carrying said incremental credit transfer information;
   said control ring processing means is also responsive to terminated ones of said incremental credit transfer messages, and operative to provide received incremental credit transfer information; and
   said source channel control unit is responsive to said received incremental credit transfer information, and operative to increase said initial channel credit value.

17. A packet switching fabric as recited in claim 13 wherein:
   said control ring processing means is further operative to generate incremental rate transfer information associated with said selected transfer data packet, said incremental rate transfer information indicating an incremental channel rate, said incremental channel rate being determined based on additional channel bandwidth for transmitting data via said associated source-destination channel path, said additional channel bandwidth being indicated by said patrol message, said additional channel bandwidth having become available since said transmission of said associated notification message;
   said control messages further include incremental rate transfer messages developed by said control ring processing means in response to said incremental rate transfer information, said incremental rate transfer message carrying said incremental rate transfer information; and
   said control ring processing means is also responsive to terminated ones of said incremental rate transfer messages, and operative to provide received incremental rate transfer information; and
   said source channel control unit is responsive to said received incremental rate transfer information, and operative to increase said channel rate.

18. A packet switching fabric as recited in claim 3 wherein each of said data packets is received via a corresponding source port of said network ports, wherein each of said received data packets includes header information specifying a corresponding destination address of a corresponding destination node, and wherein said source managing means further includes a packet routing control unit communicatively coupled to said network ports, and being responsive to said destination addresses, and being operative to generate said destination information associated with each one of said received data packets, said associated destination network port being communicatively coupled to said corresponding destination node.

19. A packet switching fabric as recited in claim 18 wherein said packet routing control unit is further operative to append each of said data bursts with block header information including said destination ID value, and an end of packet indicator for indicating whether said data burst is a last data burst of said data packet.

20. A packet switching fabric as recited in claim 1 wherein each of said control messages includes a message field for indicating a message type of said control message.

21. A packet switching fabric as recited in claim 19 wherein:
   said network interface means further includes a receive buffer queue connected to each of said network ports, each said receive buffer queue having an input connected to receive data packets from a corresponding one of said network ports, and an output connected via a bus to said packet routing control means and also to said packet buffer; and
   said destination managing unit includes a data distribution control unit coupled to receive said data bursts received by said data processing means, and having a plurality of outputs each connected to one of said network ports via a corresponding one of a plurality of transmit buffer queues, said data distribution control means including means for reading header information of said data bursts and distributing said data bursts to said corresponding said destination ports.

22. A packet switching fabric as recited in claim 21 wherein said data distribution control means includes a multicast queue for distributing multicast data bursts, having header information specifying multicast addresses, to corresponding multiple ones of said transmit buffer queues for transmission to multiple destination nodes.

23. A packet switching fabric as recited in claim 3 wherein said transmit queue buffers are not large enough to store a whole one of said data packets and wherein cut through packet transfer is implemented through said transmit buffer queues.

24. A packet switching fabric as recited in claim 6 wherein each of said memory units is implemented by a dynamic RAM memory unit.

25. A packet switching fabric as recited in claim 1 wherein at least one of said network links is an Ethernet link having a bandwidth of 100 Mbps.

26. A packet switching fabric as recited in claim 1 wherein at least one of said network links is an Ethernet link having a bandwidth of 1 Gbps.

27. A packet switching fabric comprising:
  means forming a data ring including a plurality of data ring segments;
  means forming a control ring;
  means forming a plurality of data communication network links each having at least one network node coupled thereto; and
  a plurality of switching devices coupled together by said data ring means and said control ring means so that said network links can be selectively communicatively coupled, each adjacent pair of said switching devices being coupled together by a corresponding one of said data ring segments, each said switching device including,
    network interface means having at least one network port for transmitting and
    receiving data packets to and from said network links,
    packet buffer means having at least one memory unit for storing the received data packets,
    data ring processing means for transmitting and receiving data bursts of said received data packets to and from adjacent ones of said devices via said data ring means,
    source managing means communicatively coupled to each of said memory units via a corresponding memory unit link, and also communicatively coupled to said data ring processing means and said network interface means, said source managing means being operative to develop pointer information for storing and reading each one of said received data packets to and from said packet buffer means, and also being operative to develop destination identification information associated with each one of said received data packets, said destination identification information indicating an associated destination one of said network ports of an associated destination one of said devices,
    control ring processing means operative to develop, transmit and receive control messages to and from adjacent ones of said devices via said control ring means,
    said control messages for controlling packet transfer operations including transmitting associated selected ones of said received data packets from said associated source device to said associated destination device via an associated source-destination channel path including associated ones of said data ring segments and an associated one of said memory unit links, said control ring processing means being responsive to a channel resource patrol message received from an adjacent one of said devices, said patrol message carrying channel bandwidth information indicative of bandwidth available on said data ring means and bandwidth available on said memory unit links, said control ring processing means being responsive to said channel bandwidth information and operative to read and modify said channel bandwidth information for the purpose of managing data transfer via said data ring means and via each of said memory unit links, and
    destination managing means for receiving data bursts of said received data packets from said data ring processing means, and for providing said data bursts to said associated destination network ports.

28. A packet switching fabric as recited in claim 27 wherein:
  said received data packets include transfer packets received at an associated source one of said devices that is different from said associated destination device, and local packets for which said associated destination network port is a port of said associated source device, the pointer information and destination identification information associated with each one of said local packets providing local announcement information serving as a local request for access to said associated destination network port, the pointer information and destination identification information associated with each one of said transfer packets providing transfer announcement information;
  said control ring processing means is responsive to said transfer announcement information, said control messages including announcement messages each being associated with one of said transfer data packets and carrying said associated transfer announcement information, said control ring processing means also being operative to provide received transfer announcement information in response to each received one of said announcement messages, said received transfer announcement information serving as a remote request for access to said associated destination network port;
  said destination managing means is responsive to said local announcement information and said received transfer announcement information, and operative to arbitrate between competing ones of said local and remote requests for access to each of said network ports, and also operative to generate transfer notification information associated with selected ones of said transfer data packets; and
  said control messages further include transfer notification messages developed by said control ring processing means in response to said transfer notification information, each said notification message being associated with one of said transfer data packets and carrying source identification information indicative of said associated source device, each said notification message indicating to said associated source device that said associated selected transfer data packet has been granted access to said associated destination network port.

29. A packet switching fabric as recited in claim 27 wherein said channel bandwidth information comprises:
  a plurality of data ring segment bandwidth parameters each being indicative of an amount of bandwidth currently available at a corresponding one of said data ring segments; and
  a plurality of memory unit link bandwidth parameters each being indicative of an amount of bandwidth currently available at a corresponding one of said memory unit links.

30. A packet switching fabric as recited in claim 28 wherein said transfer announcement information associated with each one of said transfer data packets further includes source identification information indicating said associated source device.

31. A packet switching fabric as recited in claim 28 wherein:
  said network interface means includes a plurality of transmit buffer queues each providing for receiving data from said destination managing means, and for transmitting bursts of data to a corresponding one of said network links via a corresponding one of said network ports; and
  said destination managing means includes an output buffer manager for monitoring the availability of buffer space in each of said transmit buffer queues, and wherein each of said notification messages is transferred via said control ring means after a determination by said output buffer manager that an associated destination one of said transmit buffer queues, that is connected to said associated destination network port, includes a threshold amount of available buffer space.

32. A packet switching fabric as recited in claim 31 wherein said output buffer manager is operative to determine a number of blocks of buffer space available at each of said transmit buffer queues, each of said available blocks providing buffer space sufficient for receiving a burst of packet data from said destination managing means.

33. A packet switching fabric as recited in claim 32 wherein said notification information further comprises an initial channel credit value indicating of a number of available blocks at the destination transmit buffer queue associated with said selected transfer data packet prior to transmitting said associated notification message.

34. A packet switching fabric as recited in claim 33 wherein said patrol message is transferred via said data ring, and wherein said control ring processing means is communicatively coupled with said data ring processing means.

35. A packet switching fabric as recited in claim 34 wherein said control ring processing means is operative to read selected sets of said data ring segment bandwidth parameters and said memory unit link bandwidth parameters of said patrol message i13 response to said transfer notification information, each of said selected sets of bandwidth parameters being associated with one of said source-destination channel paths, said control ring processing means being further operative to determine a maximum amount of bandwidth currently available for transmitting data via each of said source-destination channel paths based on said associated selected set of bandwidth parameters.

36. A packet switching fabric as recited in claim 35 wherein said control ring processing means is further operative to determine an initial channel rate value associated with each one of said selected transfer data packets, each said initial channel rate value indicating an initial channel rate for transmitting bursts of said associated selected transfer data packet from said packet buffer means of said associated source device to said associated destination device via said associated source-destination channel path.

37. A packet switching fabric as recited in claim 36 wherein each of said notification messages comprises:
a destination identification field for carrying said associated destination identification information;
a source identification field for carrying said associated source identification information;
a packet location pointer field for carrying said associated pointer information;
an initial channel credit field for carrying said associated initial channel credit value; and
an initial channel rate field for carrying said associated initial channel rate value.

38. A packet switching fabric as recited in claim 37 wherein:
said control ring processing means is responsive to received ones of said notification messages, and operative to provide received notification information associated with each one of said received notification messages, said received notification information including said associated source identification information, said associated destination identification information, said associated pointer information, said associated initial channel credit value, and said associated initial channel rate value; and
said source managing means is further responsive to said received notification information, and operative to transfer data bursts of said associated selected transfer data packet from said packet buffer means to said associated destination device via said associated source-destination channel path in accordance with said associated initial credit value and said associated initial channel rate value.

39. A packet switching fabric as recited in claim 38 wherein said source managing means further comprises:
a source channel control unit responsive to said received notification information, and operative to generate an initial channel data transfer signal associated with each one of said received notification messages, each of said initial channel data transfer signals being repeatedly activated a specified number of times in accordance with said associated initial channel rate value, said specified number being determined based on said associated initial channel credit value; and
a packet buffer control unit communicatively coupled to said packet buffer means and to said network ports, said packet buffer control unit being responsive to said initial channel data transfer signals, and being operative to read said specified number of data bursts of said associated selected transfer data packet from said packet buffer means in accordance with said associated initial channel rate value.

40. A packet switching fabric as recited in claim 39 wherein said source channel control unit comprises:
a channel memory means responsive to said received notification information, and being operative to manage channel information associated with corresponding ones of said source-destination channel paths, said channel information having,
said associated source identification information, said associated pointer information, a current channel credit value indicative of a number of bursts of said selected data packet to be transmitted via said corresponding source-destination channel path, said current channel credit value being initialized to said initial channel credit value, and
a current channel rate value indicative of a channel rate for transmitting bursts of said selected data packet via said corresponding source-destination channel path, said current channel rate value being initialized to said initial channel rate value; and a channel rate timer associated with said corresponding source-destination channel path, said channel rate timer being responsive to said current channel rate value, and being operative to generate a channel rate control signal that is repeatedly activated in accordance with said current channel rate value.

41. A packet switching fabric as recited in claim 39 wherein said source channel control unit includes:
a channel memory means responsive to said received notification information, and being operative to manage channel information associated with said selected source-destination channel path, said channel information including said associated source identification information, said associated pointer information, said initial channel credit value, and said initial channel rate value; and
a channel rate timer associated with said selected source-destination channel path, said channel rate timer being responsive to said current channel rate value, and being operative to generate said initial channel data transfer signal.

42. A packet switching fabric as recited in claim 39 wherein:

said output buffer manager is further operative to generate incremental credit transfer information associated with said selected transfer data packet, said incremental credit transfer information indicating an incremental number of available blocks at said destination transmit buffer queue, said incremental number of available blocks having become available since said transmission of said associated notification message;

said control messages further include incremental credit transfer messages developed by said control ring processing means in response to said incremental credit transfer information, said incremental credit transfer message carrying said incremental credit transfer information;

said control ring processing means is also responsive to terminated ones of said incremental credit transfer messages, and operative to provide received incremental credit transfer information; and said source channel control unit is responsive to said received incremental credit transfer information, and operative to increase said initial channel credit value.

43. A packet switching fabric as recited in claim 39 wherein:

said control ring processing means is further operative to generate incremental rate transfer information associated with said selected transfer data packet, said incremental rate transfer information indicating an incremental channel rate, said incremental channel rate being determined based on additional channel bandwidth for transmitting data via said associated source-destination channel path, said additional channel bandwidth being indicated by said patrol message, said additional channel bandwidth having become available since said transmission of said associated notification message;

said control messages further include incremental rate transfer messages developed by said control ring processing means in response to said incremental rate transfer information, said incremental rate transfer message carrying said incremental rate transfer information; and said control ring processing means is also responsive to terminated ones of said incremental rate transfer messages, and operative to provide received incremental rate transfer information; and said source channel control unit is responsive to said received incremental rate transfer information, and operative to increase said channel rate.

* * * * *